(12) United States Patent
Will et al.

(10) Patent No.: US 10,197,217 B2
(45) Date of Patent: Feb. 5, 2019

(54) WALL ANCHOR ASSEMBLIES

(71) Applicant: THE HILLMAN GROUP, INC., Cincinnati, OH (US)

(72) Inventors: Gary E. Will, Gold Canyon, AZ (US); Byron K. Grice, Phoenix, AZ (US); Dale G. Malott, Middlebury, IN (US); Ryan Hamblin, Apache Junction, AZ (US)

(73) Assignee: THE HILLMAN GROUP, INC., Cincinnati, OH (US)

(*) Notice: Subject to any disclaimer, the term of this patent is extended or adjusted under 35 U.S.C. 154(b) by 43 days.

(21) Appl. No.: 15/195,152

(22) Filed: Jun. 28, 2016

(65) Prior Publication Data
US 2017/0002974 A1 Jan. 5, 2017

Related U.S. Application Data

(60) Provisional application No. 62/186,882, filed on Jun. 30, 2015, provisional application No. 62/251,877, filed on Nov. 6, 2015.

(51) Int. Cl.
*F16M 13/02* (2006.01)
*A47G 1/16* (2006.01)
(Continued)

(52) U.S. Cl.
CPC ............... *F16M 13/02* (2013.01); *A47G 1/16* (2013.01); *A47G 1/20* (2013.01); *A47G 1/205* (2013.01);
(Continued)

(58) Field of Classification Search
CPC .......... A47G 1/20; A47G 1/22; A47G 1/1633; A47G 2001/207; A47G 1/16; A47G 1/205;
(Continued)

(56) References Cited

U.S. PATENT DOCUMENTS 113,862 A 4/1871 Duffett
165,206 A 7/1875 Brown
(Continued)

FOREIGN PATENT DOCUMENTS

CN 2449598 Y 9/2001
CN 201542372 U 8/2010
(Continued)

OTHER PUBLICATIONS

PCT, International Search Report and Written Opinion, International Application No. PCT/US2016/039721; dated Sep. 9 2016, 13 pages.
(Continued)

*Primary Examiner* — Jonathan Liu
*Assistant Examiner* — Taylor L Morris
(74) *Attorney, Agent, or Firm* — Thompson Hine L.L.P.

(57) ABSTRACT

An anchor assembly for hanging an object on a wall includes a first anchor component and a second anchor component. The first anchor component includes a base having front, back, top, bottom, left and right sides, and at least one wall penetrating retainer extending from the base and having a wall penetrating extent that protrudes rearwardly of the base and has a downwardly curved configuration. The second anchor component includes a base having front, back, top, bottom, left and right sides, at least one wall penetrating retainer extending from the base of the second anchor component and having a wall penetrating extent that protrudes rearwardly of the base of the second anchor component and has a curved configuration. The second anchor component is pivotably associated with the first anchor component for movement between an anchoring orientation and a non-anchoring orientation.

37 Claims, 22 Drawing Sheets

(51) Int. Cl.
*F16B 15/00* (2006.01)
*A47G 1/20* (2006.01)
*A47G 1/22* (2006.01)
*F16B 45/00* (2006.01)
*F16B 15/02* (2006.01)

(52) U.S. Cl.
CPC .......... *F16B 15/00* (2013.01); *A47G 1/1633* (2013.01); *A47G 1/22* (2013.01); *F16B 15/02* (2013.01); *F16B 45/00* (2013.01)

(58) Field of Classification Search
CPC ...... A47G 1/202; A47F 5/0823; F16M 13/02; F16B 45/00
USPC .......... 248/216.1, 217.1, 217.3, 220.21, 301
See application file for complete search history.

(56) References Cited

U.S. PATENT DOCUMENTS

| | | | |
|---|---|---|---|
| 251,616 A | 12/1881 | McGill | |
| 297,173 A | 4/1884 | Sellger | |
| 371,205 A | 10/1887 | McConnoughay | |
| 423,730 A | 3/1890 | Charlton | |
| 444,933 A | 1/1891 | Barnes | |
| 489,593 A | 1/1893 | Ramer | |
| 763,448 A | 6/1904 | Winter | |
| 769,794 A | 9/1904 | Fowler | |
| 777,879 A * | 12/1904 | Blum | F16B 45/02 |
| | | | 2/342 |
| 795,704 A | 7/1905 | Jones | |
| 874,412 A | 12/1907 | Lewis | |
| 938,998 A | 11/1909 | Evans | |
| 965,151 A | 7/1910 | Benjamin | |
| 992,203 A * | 5/1911 | Johnson | A47G 1/22 |
| | | | 211/87.01 |
| 998,015 A | 7/1911 | Kopsa | |
| 1,002,910 A | 9/1911 | Foote | |
| 1,270,718 A | 6/1918 | Ford | |
| 1,306,114 A | 6/1919 | Koval | |
| 1,343,855 A | 6/1920 | Tyler | |
| 1,425,873 A | 8/1922 | Lineaweaver | |
| 1,651,392 A * | 12/1927 | Honigbaum | A47G 1/22 |
| | | | 248/217.3 |
| 1,802,934 A | 4/1931 | Balch | |
| 1,883,834 A | 10/1932 | Turner | |
| 1,958,497 A | 5/1934 | Rivers | |
| 2,062,887 A | 12/1936 | Karst | |
| 2,119,931 A | 6/1938 | Smith | |
| 2,197,750 A * | 4/1940 | Lagaard | E04F 13/0835 |
| | | | 248/217.3 |
| 2,295,370 A | 9/1942 | Tritt | |
| 2,317,368 A | 4/1943 | Frey | |
| 2,334,700 A | 11/1943 | Frey | |
| 2,505,324 A | 4/1950 | Cornelius | |
| 2,539,825 A | 1/1951 | Genua | |
| 2,577,011 A | 12/1951 | Hallenscheid | |
| 2,751,807 A | 6/1956 | Harre | |
| 2,980,309 A | 4/1961 | Papas | |
| 3,001,752 A * | 9/1961 | Loy | A47B 96/061 |
| | | | 182/87 |
| 3,004,815 A | 10/1961 | O'Kain | |
| 3,020,602 A | 2/1962 | Siering | |
| 3,174,592 A | 3/1965 | Berman | |
| 3,226,065 A | 12/1965 | Smith | |
| 3,298,651 A | 1/1967 | Passer | |
| 3,319,917 A * | 5/1967 | Bilodeau | A47F 5/0823 |
| | | | 248/220.43 |
| 3,425,568 A | 2/1969 | Albright | |
| 3,503,147 A | 3/1970 | Herrin | |
| 3,524,584 A | 8/1970 | Ihlenfeld | |
| 3,620,404 A | 11/1971 | Grasso | |
| 3,640,497 A * | 2/1972 | Waki | A47F 5/0823 |
| | | | 211/59.1 |
| 3,666,936 A | 5/1972 | Webster | |
| 3,685,778 A | 8/1972 | Berns | |
| 3,754,805 A | 8/1973 | Pangburn | |
| 3,775,884 A | 12/1973 | Smith | |
| 3,813,800 A | 6/1974 | Turner | |
| 3,861,631 A | 1/1975 | Shorin | |
| 3,891,172 A * | 6/1975 | Einhorn | A47F 5/0823 |
| | | | 248/220.43 |
| 3,912,211 A | 10/1975 | Toff | |
| 3,926,394 A | 12/1975 | Mauceri et al. | |
| 3,966,157 A | 6/1976 | Corral et al. | |
| 3,995,822 A | 12/1976 | Einhorn et al. | |
| 4,017,048 A | 4/1977 | Einhorn | |
| 4,039,138 A | 8/1977 | Einhorn | |
| 4,040,149 A | 8/1977 | Einhorn | |
| 4,082,243 A | 4/1978 | Watt | |
| 4,083,314 A | 4/1978 | Garvin | |
| 4,124,189 A | 11/1978 | Einhorn | |
| 4,134,625 A | 1/1979 | Palka | |
| D255,301 S | 6/1980 | Windisch | |
| 4,208,012 A | 6/1980 | Dutcher | |
| 4,221,442 A | 9/1980 | Harangozo | |
| 4,228,982 A | 10/1980 | Sellera | |
| 4,237,630 A | 12/1980 | Franzone | |
| 4,262,605 A | 4/1981 | Sokol | |
| 4,293,173 A | 10/1981 | Tricca | |
| 4,294,778 A | 10/1981 | DeLuca | |
| 4,300,745 A | 11/1981 | Peterson | |
| 4,304,447 A | 12/1981 | Ellwood | |
| 4,317,603 A | 3/1982 | Pepicelli | |
| 4,333,625 A | 6/1982 | Haug | |
| 4,340,144 A | 7/1982 | Cousins | |
| 4,372,450 A | 2/1983 | Licari | |
| 4,422,608 A | 12/1983 | Hogg | |
| 4,452,500 A | 6/1984 | Zlotnik | |
| 4,458,387 A | 7/1984 | Pearson | |
| 4,485,995 A | 12/1984 | Hogg | |
| 4,505,226 A | 3/1985 | Carlson | |
| 4,506,856 A * | 3/1985 | Rich | A47F 5/0823 |
| | | | 248/220.31 |
| 4,509,713 A * | 4/1985 | Hogg | A47G 1/20 |
| | | | 248/217.4 |
| 4,572,380 A | 2/1986 | Langwell | |
| 4,583,647 A | 4/1986 | Schinzing | |
| D285,743 S | 9/1986 | Richwine | |
| 4,613,108 A | 9/1986 | Sundstrom et al. | |
| D286,118 S | 10/1986 | Gecchelin | |
| 4,655,423 A | 4/1987 | Schavilje et al. | |
| 4,681,380 A | 7/1987 | Carlin | |
| 4,719,917 A | 1/1988 | Barrows et al. | |
| 4,831,754 A | 5/1989 | Tallent | |
| 4,932,519 A | 6/1990 | Trauschke | |
| 4,976,057 A | 12/1990 | Bianchi | |
| 4,998,361 A | 3/1991 | Gordon | |
| 5,110,080 A | 5/1992 | Rieman | |
| 5,135,194 A | 8/1992 | Laughon | |
| 5,149,037 A | 9/1992 | Smith | |
| 5,241,715 A | 9/1993 | Duvall | |
| 5,265,357 A | 11/1993 | Yu | |
| 5,267,718 A * | 12/1993 | Sheehan | A47G 1/22 |
| | | | 248/217.3 |
| 5,267,719 A | 12/1993 | Keller | |
| 5,325,815 A | 7/1994 | Gumpesberger | |
| 5,332,108 A | 7/1994 | Blass | |
| 5,372,346 A | 12/1994 | Upchurch | |
| 5,401,094 A | 3/1995 | Walsten | |
| 5,477,010 A | 12/1995 | Buckshaw | |
| 5,484,126 A | 1/1996 | Kitchin | |
| 5,495,954 A | 3/1996 | Schmidt | |
| 5,507,248 A | 4/1996 | Gabbed | |
| 5,517,947 A | 5/1996 | Christman | |
| 5,570,938 A | 11/1996 | Butler | |
| 5,586,934 A | 12/1996 | Dombrowski | |
| 5,638,644 A | 6/1997 | Bastian | |
| 5,641,079 A * | 6/1997 | Schmidt | A47F 5/0823 |
| | | | 211/104 |
| 5,727,698 A | 3/1998 | Lai | |
| 5,743,038 A | 4/1998 | Soto | |
| 5,806,223 A | 9/1998 | Visagie | |
| D399,692 S | 10/1998 | Wilcox | |

(56) References Cited

U.S. PATENT DOCUMENTS

| | | |
|---|---|---|
| 5,819,958 A | 10/1998 | Dement |
| 5,839,649 A | 11/1998 | Clark |
| 5,878,988 A | 3/1999 | Rakower |
| 6,042,243 A | 3/2000 | Grill |
| 6,045,374 A | 4/2000 | Candeloro |
| 6,051,788 A | 4/2000 | Nichols |
| 6,109,461 A | 5/2000 | Kluge |
| 6,126,126 A | 10/2000 | McKiernan, Jr. |
| D434,303 S | 11/2000 | DeCosta |
| 6,158,828 A | 12/2000 | Vacovsky |
| D436,841 S | 1/2001 | Carpenter |
| 6,179,136 B1 | 1/2001 | Kluge |
| 6,202,838 B1 | 3/2001 | Tran |
| 6,279,862 B1 | 8/2001 | Gershowitz |
| 6,299,001 B1 | 10/2001 | Frolov |
| 6,325,345 B1 | 12/2001 | Carpenter |
| 6,351,905 B1 | 3/2002 | Dean |
| 6,371,427 B1 | 4/2002 | Johnson |
| 6,431,510 B1 | 8/2002 | Puritz |
| D465,348 S | 11/2002 | Lucatello |
| 6,478,273 B1 | 11/2002 | McKiernan, Jr. et al. |
| 6,585,205 B2 * | 7/2003 | Beaty ............ A47G 1/20 248/218.1 |
| 6,641,107 B1 | 11/2003 | Janssen |
| 6,641,344 B2 | 11/2003 | Weiss |
| D486,057 S | 2/2004 | Chen |
| D494,452 S | 8/2004 | Sheldon et al. |
| 6,775,935 B1 | 8/2004 | Cohen et al. |
| 6,830,228 B2 | 12/2004 | Ernst |
| 6,932,225 B2 | 8/2005 | Rowe |
| D511,088 S | 11/2005 | Chiu |
| D513,562 S | 1/2006 | Boffo |
| D515,911 S | 2/2006 | McDuff |
| 6,994,448 B1 | 2/2006 | Gorrell |
| D516,412 S | 3/2006 | McDuff |
| D517,344 S | 3/2006 | Zens |
| 7,086,543 B2 | 8/2006 | Remmers |
| 7,146,760 B2 | 12/2006 | Yiu |
| 7,225,935 B2 | 6/2007 | Breymaier |
| D554,483 S | 11/2007 | Hager et al. |
| 7,395,998 B2 | 7/2008 | Peterson |
| 7,398,013 B2 | 7/2008 | He |
| 7,431,258 B2 | 10/2008 | Lamotta |
| 7,497,028 B2 | 3/2009 | Nevers et al. |
| 7,506,772 B2 | 3/2009 | Chen |
| D596,930 S | 7/2009 | Gaudron |
| 7,591,097 B2 | 9/2009 | Alman |
| D606,185 S | 12/2009 | Wefler |
| 7,669,723 B2 | 3/2010 | Kao |
| 7,694,401 B2 | 4/2010 | Peterson |
| 7,708,252 B2 | 5/2010 | Vander Berg et al. |
| 7,900,783 B2 | 3/2011 | Fernandez |
| D635,843 S | 4/2011 | McDuff et al. |
| D636,256 S | 4/2011 | McDuff et al. |
| 7,931,159 B2 | 4/2011 | Kao |
| D649,022 S | 11/2011 | McDuff et al. |
| D649,023 S | 11/2011 | McDuff et al. |
| D649,436 S | 11/2011 | McDuff et al. |
| D649,437 S | 11/2011 | McDuff et al. |
| D649,438 S | 11/2011 | McDuff et al. |
| D649,439 S | 11/2011 | McDuff et al. |
| D650,261 S | 12/2011 | McDuff et al. |
| 8,074,603 B2 | 12/2011 | Ohlman |
| 8,114,226 B2 | 2/2012 | Ernst et al. |
| 8,210,368 B2 | 7/2012 | Schwartzkopf |
| 8,272,610 B2 | 9/2012 | Ernst et al. |
| 8,308,116 B2 | 11/2012 | Daniels |
| 8,317,148 B2 | 11/2012 | Ernst et al. |
| D672,224 S | 12/2012 | Brinson et al. |
| 8,333,356 B2 | 12/2012 | Ernst et al. |
| 8,398,048 B2 | 3/2013 | Popkin et al. |
| 8,414,239 B2 | 4/2013 | McDuff |
| 8,434,629 B2 | 5/2013 | Fernanadez |
| 8,448,910 B2 | 5/2013 | Ernst et al. |
| 8,667,765 B1 * | 3/2014 | McCarthy ............ E04F 13/0841 248/301 |
| 8,740,171 B2 | 6/2014 | Crescenzo |
| 8,757,570 B2 | 6/2014 | Ernst et al. |
| 8,813,404 B2 | 8/2014 | Goppion |
| 8,833,876 B2 | 9/2014 | Lee |
| 8,839,964 B2 | 9/2014 | Hawkins |
| 8,857,780 B1 | 10/2014 | Goss |
| D717,114 S | 11/2014 | Katterheinrich |
| 8,974,166 B2 | 3/2015 | McDuff |
| D731,716 S | 6/2015 | Kuiper |
| 9,044,110 B2 | 6/2015 | McDuff et al. |
| D744,773 S | 12/2015 | Yoon |
| 9,261,229 B2 | 2/2016 | Callif et al. |
| 9,296,552 B2 | 3/2016 | Schleuning |
| 9,307,837 B2 | 4/2016 | Wood |
| 9,380,885 B1 | 7/2016 | Nguyen |
| 9,496,695 B2 | 11/2016 | Battaglia |
| 9,563,078 B2 | 2/2017 | Ryu |
| 9,593,523 B1 | 3/2017 | Trimble |
| D783,907 S | 4/2017 | Ohlman |
| 9,668,596 B2 | 6/2017 | Crescenzo |
| D797,464 S | 9/2017 | Vitale |
| 9,826,828 B1 | 11/2017 | Vaughan |
| D804,287 S | 12/2017 | Baldwin |
| 2002/0026736 A1 | 3/2002 | Spencer |
| 2002/0088912 A1 | 7/2002 | Yu |
| 2002/0182910 A1 | 12/2002 | Kiughadush |
| 2003/0071182 A1 | 4/2003 | Beaty et al. |
| 2003/0161680 A1 | 8/2003 | Suckow |
| 2003/0178545 A1 | 9/2003 | Ernst |
| 2004/0231218 A1 | 11/2004 | Dominioni |
| 2004/0261307 A1 | 12/2004 | Siegel |
| 2005/0000854 A1 | 1/2005 | Madigan |
| 2005/0279041 A1 | 12/2005 | Staples |
| 2006/0180557 A1 | 8/2006 | Weinstein |
| 2006/0182517 A1 | 8/2006 | McDuff |
| 2007/0006504 A1 | 1/2007 | Kao |
| 2007/0063119 A1 | 3/2007 | Huang |
| 2007/0084743 A1 | 4/2007 | Chu |
| 2007/0124910 A1 | 6/2007 | Peterson et al. |
| 2007/0194202 A1 | 8/2007 | Lamotta |
| 2007/0205344 A1 | 9/2007 | Liermann et al. |
| 2007/0235622 A1 | 10/2007 | Baran et al. |
| 2007/0256850 A1 | 11/2007 | Hanse |
| 2008/0187688 A1 | 8/2008 | Gunther |
| 2008/0251682 A1 | 10/2008 | Repac |
| 2008/0283205 A1 | 11/2008 | Zimmer |
| 2008/0296456 A1 | 12/2008 | Lien |
| 2008/0302936 A1 | 12/2008 | Forbes et al. |
| 2009/0015121 A1 | 1/2009 | Sampson |
| 2009/0145804 A1 | 6/2009 | Kabel |
| 2009/0307953 A1 | 12/2009 | Ahlstrom |
| 2010/0084530 A1 | 4/2010 | Lai |
| 2010/0178448 A1 | 7/2010 | Nakajima |
| 2010/0213333 A1 | 8/2010 | Mejia et al. |
| 2010/0219312 A1 | 9/2010 | Johnson et al. |
| 2010/0300999 A1 | 12/2010 | Schwartzkopf |
| 2010/0326019 A1 | 12/2010 | Lofgren |
| 2011/0147236 A1 | 6/2011 | Johnson |
| 2011/0188250 A1 | 8/2011 | Waldhuetter |
| 2012/0001039 A1 | 1/2012 | McDuff et al. |
| 2012/0001040 A1 | 1/2012 | McDuff et al. |
| 2012/0056051 A1 | 3/2012 | Gold |
| 2012/0080343 A1 | 4/2012 | Gretz |
| 2012/0146470 A1 | 6/2012 | Katz |
| 2013/0105426 A1 | 5/2013 | Dyck |
| 2014/0144055 A1 | 5/2014 | Byfield |
| 2014/0212602 A1 | 7/2014 | Thornton |
| 2014/0231604 A1 | 8/2014 | Long |
| 2014/0259840 A1 | 9/2014 | Placko |
| 2014/0263122 A1 | 9/2014 | Roberts |
| 2014/0263924 A1 | 9/2014 | Crescenzo |
| 2014/0346310 A1 | 11/2014 | Yang |
| 2015/0060627 A1 | 3/2015 | Stauber |
| 2015/0308613 A1 | 10/2015 | Callif et al. |
| 2016/0029814 A1 | 2/2016 | Brown |
| 2017/0000270 A1 | 1/2017 | Will |

(56) References Cited

U.S. PATENT DOCUMENTS

2017/0246546 A1   8/2017  Brown
2017/0347812 A1  12/2017  Will
2018/0100617 A1   4/2018  Forrest

FOREIGN PATENT DOCUMENTS

GB            676903      8/1952
WO    WO 1999/052741     10/1999
WO    WO 2007/095351 A2   8/2007
WO    WO 2015/150222     10/2015

OTHER PUBLICATIONS

List of Patents or Patent Applications Treated as Related, submitted herewith.

* cited by examiner

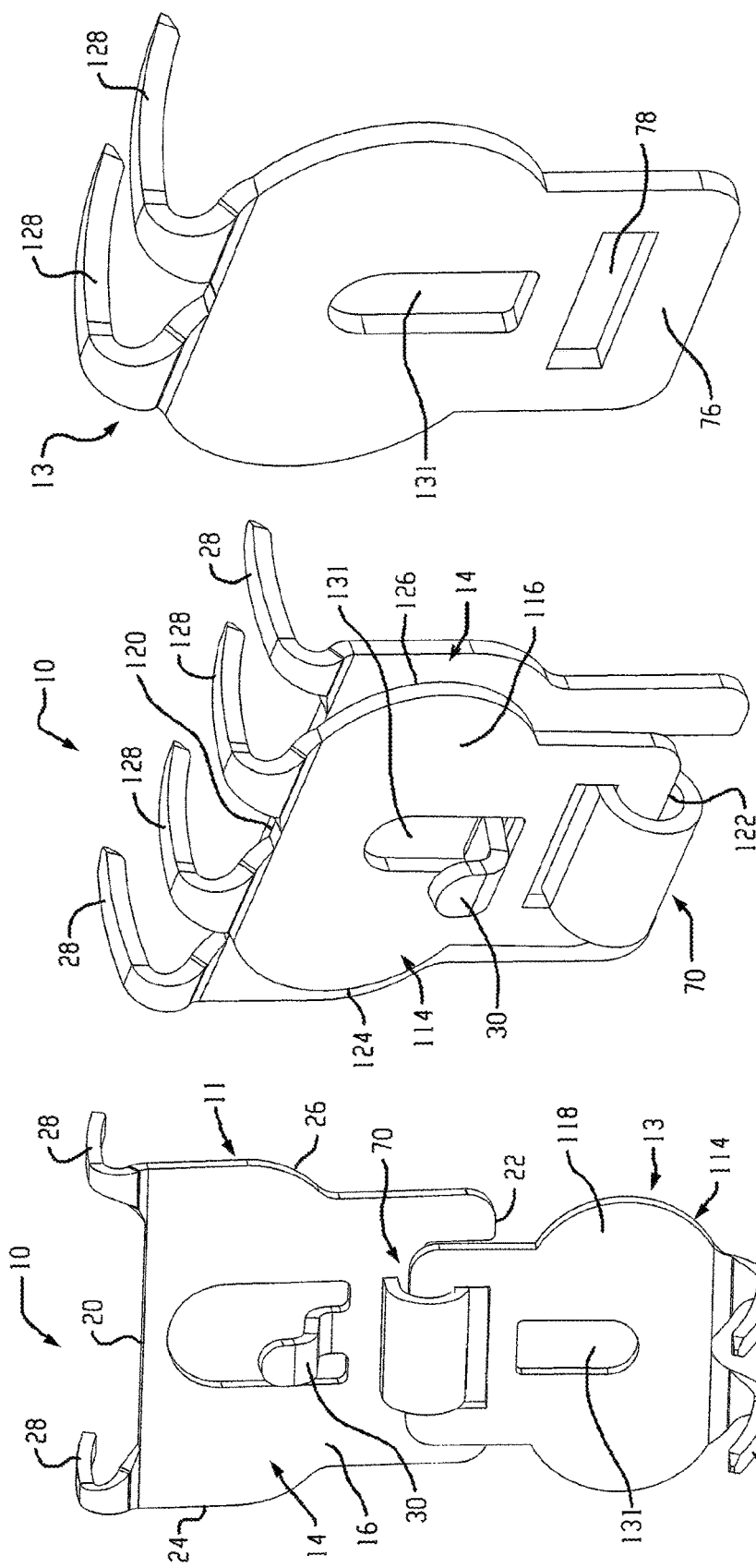

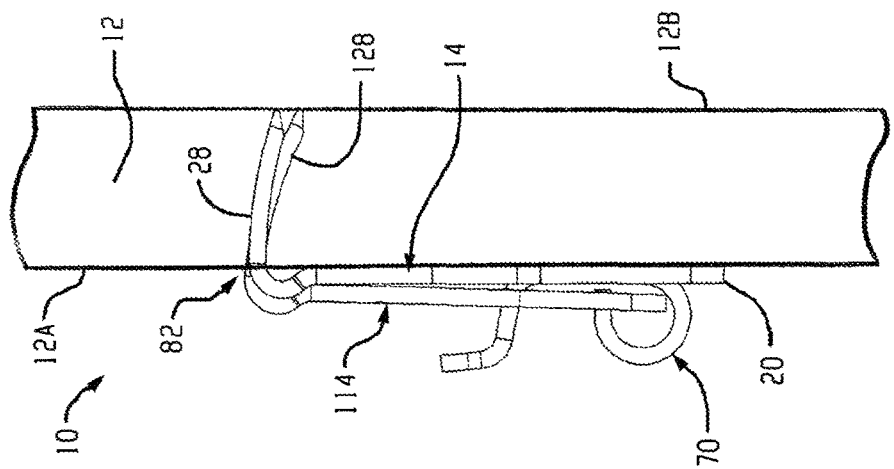
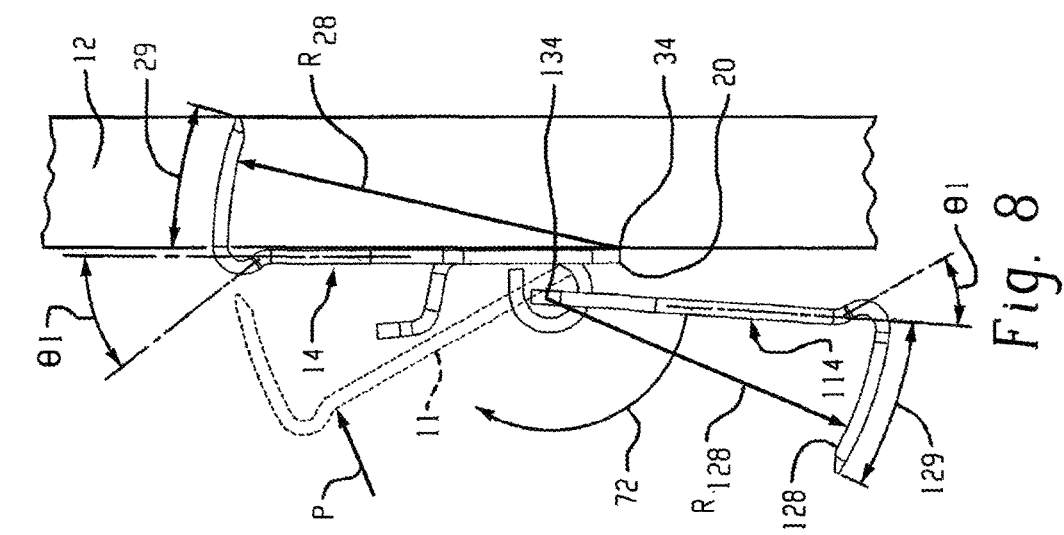
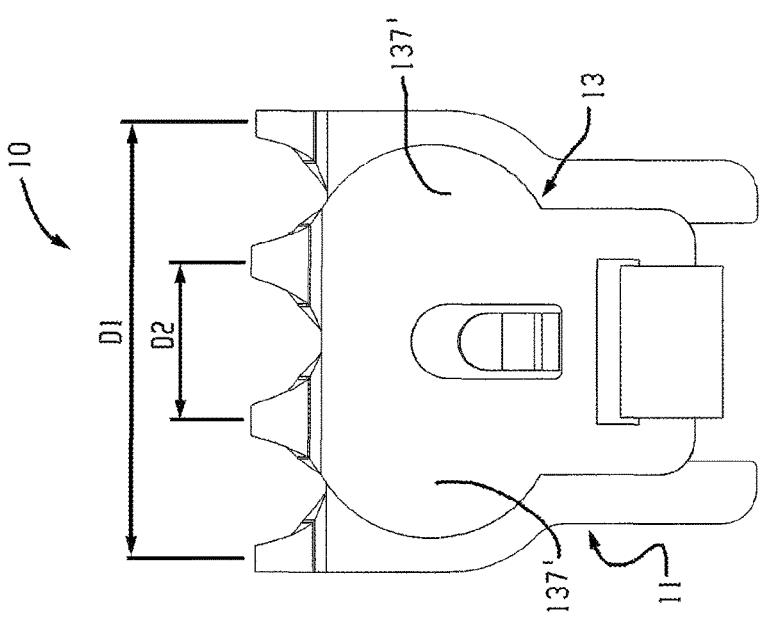

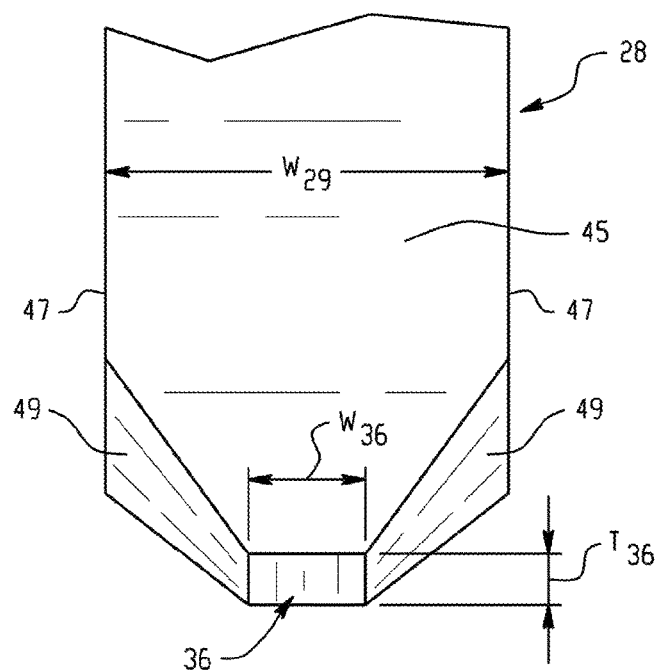
Fig. 13
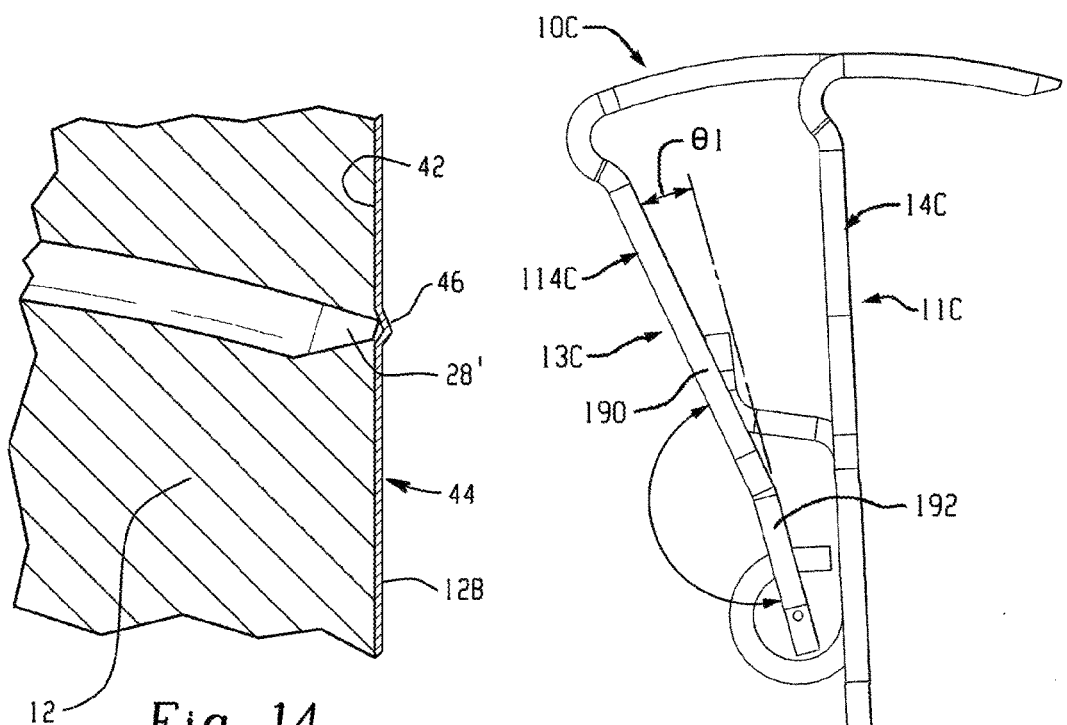
Fig. 14
Fig. 15

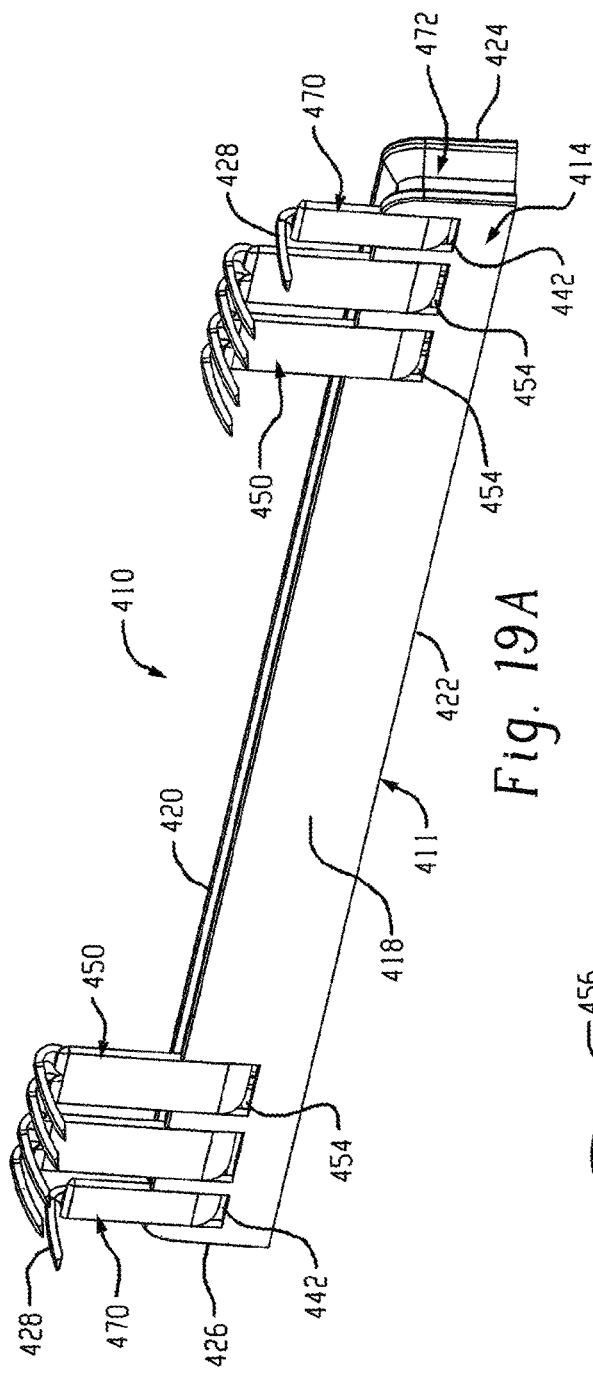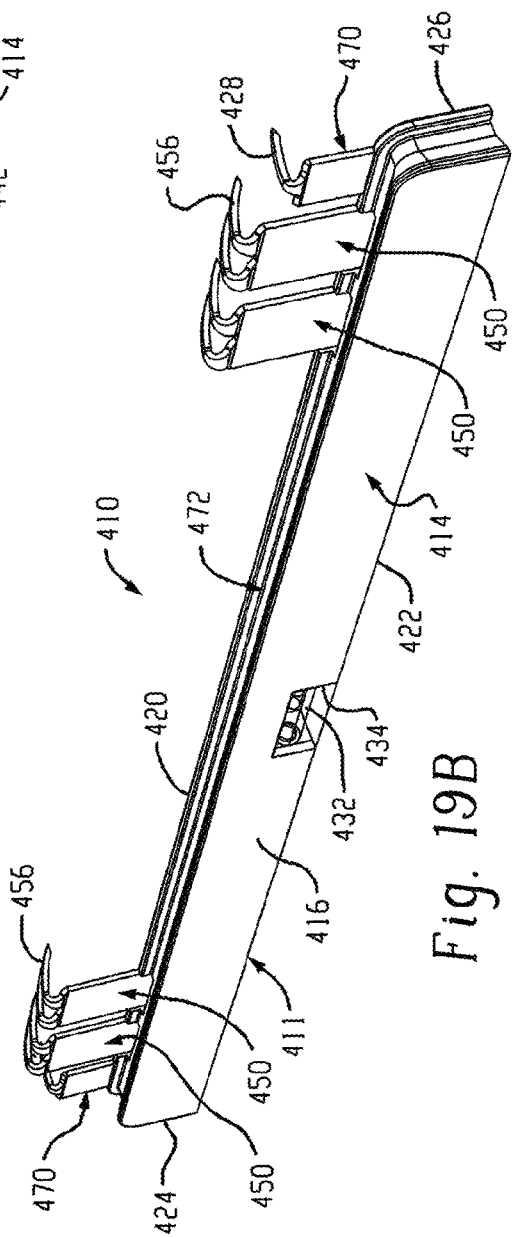

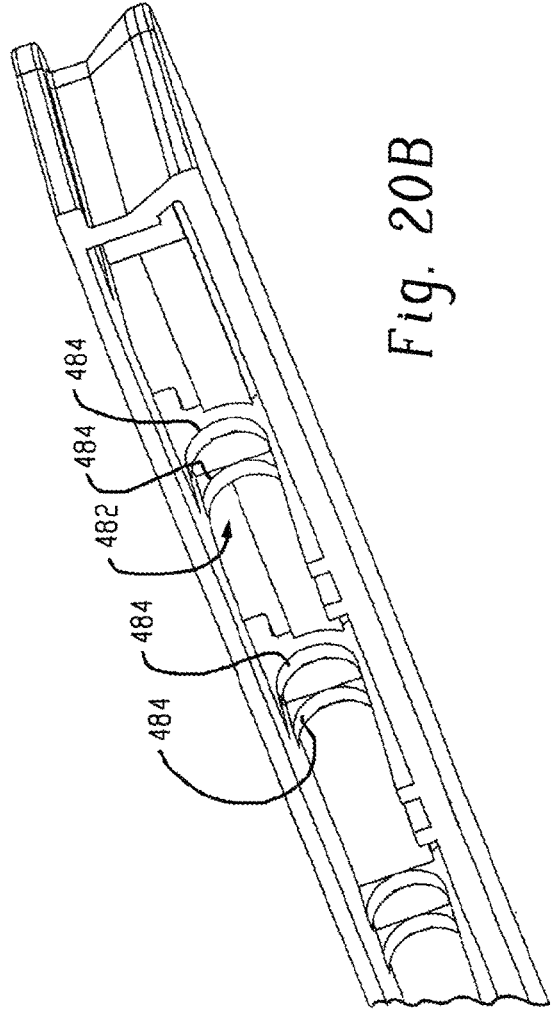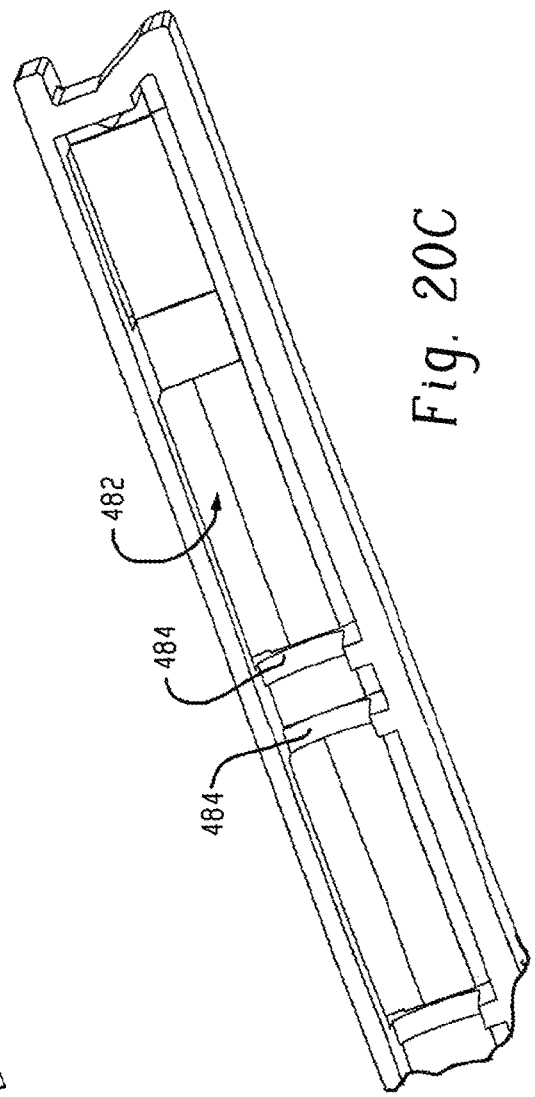

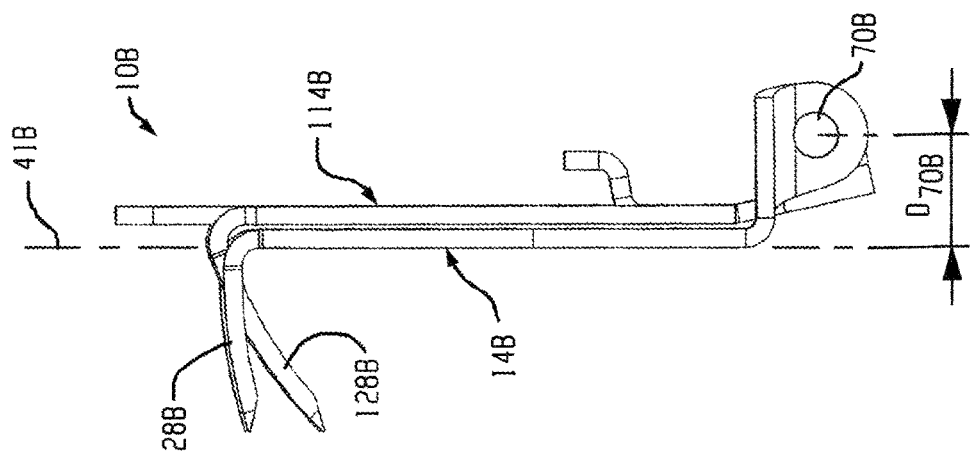
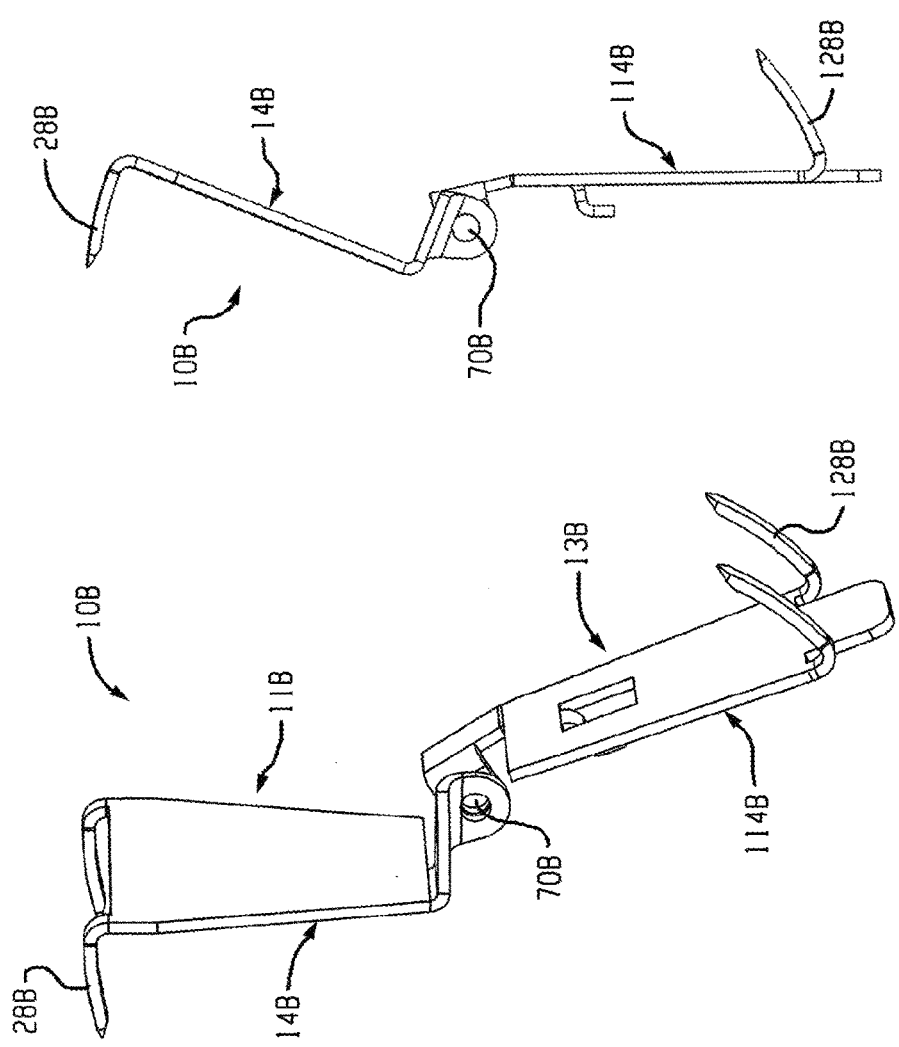

WALL ANCHOR ASSEMBLIES

TECHNICAL FIELD

This application relates generally to wall anchors and related systems, methods and components.

BACKGROUND

Numerous products exist for installing a hook or hanging device in a wall, such as for hanging a picture frame, a mirror, or the like. Conventional nails and screws are not always convenient solutions and may not provide sufficient support strength in the wall, particularly in the case of drywall, or other friable wallboards, which are relatively weak.

Anchors incorporating curved saber tooth shaped retainers are known from U.S. Pat. Nos. 8,974,166 and 8,414,239. However, such anchors are still difficult for the typical homeowner to install and use properly because a hammer is generally needed to complete the anchor installation. These anchors also generally have a large wall penetration that tends to crumble and weaken the surrounding wall media adjacent the penetration and leave a large hole that is not easily repaired. It is also impractical to reposition these types of anchors after initial insertion in locations proximate the original hole for the purpose of making minor position adjustments.

It would be desirable to provide an anchor device and related installation method that facilitates ease of installation, but at the same time results in an anchor with a high support strength and less damage to the wallboard, leaving relatively small holes upon anchor removal and therefore also permitting minor position adjustments if needed. To provide these advantages in connection with an anchor that installs without reference to stud or other supporting structure location and/or without concern for wires or pipes behind the wall, would also be beneficial.

SUMMARY

In one aspect, an anchor assembly for hanging an object on a wall includes a first anchor component and a second anchor component. The first anchor component includes a base having front, back, top, bottom, left and right sides, and at least one wall penetrating retainer extending from the base and having a wall penetrating extent that protrudes rearwardly of the base and has a downwardly curved configuration. The second anchor component includes a base having front, back, top, bottom, left and right sides, at least one wall penetrating retainer extending from the base of the second anchor component and having a wall penetrating extent that protrudes rearwardly of the base of the second anchor component and has a curved configuration. The second anchor component is pivotably associated with the first anchor component for movement between an anchoring orientation and a non-anchoring orientation. In the anchoring orientation the back side of the base of the second anchor component is positioned at least in part in front of the front side of the base of the first anchor component and the wall penetrating extent of the second anchor component has a downwardly curved configuration and protrudes rearwardly of the base of the first anchor component. In the non-anchoring orientation the second anchor component is pivoted away from the first anchor component. At least one hook element extends forwardly from the anchor assembly when the second anchor component is in the anchoring orientation.

In another aspect, an anchor assembly for hanging an object on a wall includes a first anchor component and a second anchor component. The first anchor component includes a first base having front and back sides, one or more wall penetrating retainers extending from the first base, each wall penetrating retainer having a wall penetrating extent that protrudes rearwardly of the base and has a curved configuration. The second anchor component includes a second base having front and back sides, one or more wall penetrating retainers extending from the second base, each wall penetrating retainer of the second anchor component having a wall penetrating extent that protrudes rearwardly of the second base and has a curved configuration. The second anchor component is pivotably associated with the first anchor component via a hinge connection for movement between an anchoring orientation and a non-anchoring orientation to enable staged installation of the anchor assembly into a wall.

In another aspect, an anchor assembly for hanging an object on a wall includes a first anchor component and a second anchor component. The first anchor component includes a laterally elongated base member having front, back, top, bottom, left and right sides, at least two spaced apart wall penetrating retainers extending from the base member, each wall penetrating retainer having a wall penetrating extent that protrudes rearwardly of the base member and has a downwardly curved configuration. The second anchor component is pivotably associated with the base member for movement between an anchoring orientation and a non-anchoring orientation. The second anchor component includes at least one wall penetrating retainer that extends therefrom and has a downwardly curved configuration when the second anchor member is in its anchoring orientation. A third anchor component is pivotably associated with the base member for movement between an anchoring orientation and a non-anchoring orientation. The third anchor component includes at least one wall penetrating retainer that extends therefrom and has a downwardly curved configuration when the third anchor component is in its anchoring orientation. The second and third anchor components are pivotable relative the base member independently of each other for selective engagement with a wall in a staged manner.

In another aspect, a method of installing an anchor assembly on a wall involves: utilizing an anchor assembly with a first anchor component and a second anchor component, where the second anchor component is pivotably connected to the first anchor component, and each anchor component includes a respective base and at least one wall penetrating retainer extending from the base; placing the anchor assembly against a wall with the base of the first anchor component in contact with the wall and a distal end of the wall penetrating retainer in contact with the wall; manually applying force against the base of the first anchor component to rotate the wall penetrating retainer of the first anchor component into the wall; thereafter pivoting the second anchor component toward the first anchor component until a distal end of the wall penetrating retainer of the second anchor component contacts the wall; and manually applying force against the base of the second anchor component to rotate the wall penetrating retainer of the second anchor component into the wall.

In another aspect, an anchor assembly for hanging an object on a wall includes a first anchor component and a second anchor component. The first anchor component includes a first base having front and back sides, one or more wall penetrating retainers extending from the first base, each wall penetrating retainer having a wall penetrating extent that protrudes rearwardly of the base and has a curved configuration. The second anchor component includes a second base having front and back sides, one or more wall penetrating retainers extending from the second base, each wall penetrating retainer of the second anchor component having a wall penetrating extent that protrudes rearwardly of the second base and has a curved configuration. The second anchor component is connected to the first anchor component via a pivoting connection for movement between an anchoring orientation and a non-anchoring orientation to enable staged installation of the anchor assembly into a wall. When the second anchor component is in the anchoring orientation, each wall penetrating extent of the second anchor component protrudes rearwardly of the base of the first anchor component, each wall penetrating extent of the second anchor component has a curvature that is in a same direction as a curvature of each wall penetrating extent of the first anchor component and the curvature of each wall penetrating extent of the second anchor component is more aggressive than the curvature of each wall penetrating extent of the first anchor component.

In another aspect, an anchor assembly for hanging an object on a wall includes a first anchor component and a second anchor component. The first anchor component includes a first base having front and back sides, one or more wall penetrating retainers extending from the first base, each wall penetrating retainer having a wall penetrating extent that protrudes rearwardly of the base and has a curved configuration. The second anchor component includes a second base having front and back sides, one or more wall penetrating retainers extending from the second base, each wall penetrating retainer of the second anchor component having a wall penetrating extent that protrudes rearwardly of the second base and has a curved configuration. The second anchor component is connected to the first anchor component via a pivoting connection for movement between an anchoring orientation and a non-anchoring orientation to enable staged installation of the anchor assembly into a wall. When the second anchor component is in the anchoring orientation, each wall penetrating extent of the second anchor component extends over an upper edge of the base of the first anchor component, protrudes rearwardly of the base of the first anchor component, and has a curvature that is in a same direction as a curvature of each wall penetrating extent of the first anchor component.

In another aspect, an anchor assembly for hanging an object on a wall includes a first anchor component and a second anchor component. The first anchor component includes a first base having front and back sides, one or more wall penetrating retainers extending from the first base, each wall penetrating retainer having a wall penetrating extent that protrudes rearwardly of the base and has a curved configuration. The second anchor component includes a second base having front and back sides, one or more wall penetrating retainers extending from the second base, each wall penetrating retainer of the second anchor component having a wall penetrating extent that protrudes rearwardly of the second base and has a curved configuration. The second anchor component is connected to the first anchor component via a pivoting connection for movement between an anchoring orientation and a non-anchoring orientation to enable staged installation of the anchor assembly into a wall. The base of the first anchor component is formed by a plate, and the base of the second anchor component is formed by a plate. When the second anchor component is in the anchoring orientation, each wall penetrating extent of the second anchor component protrudes rearwardly of the base of the first anchor component, and the plate of the second anchor component overlies the plate of the first anchor component.

In another aspect, an anchor assembly for hanging an object on a wall includes a first anchor component and a second anchor component. The first anchor component includes a first base having front and back sides, one or more wall penetrating retainers extending from the first base, each wall penetrating retainer having a wall penetrating extent that protrudes rearwardly of the base and has a curved configuration. The second anchor component includes a second base having front and back sides, one or more wall penetrating retainers extending from the second base, each wall penetrating retainer of the second anchor component having a wall penetrating extent that protrudes rearwardly of the second base and has a curved configuration. The second anchor component connected to the first anchor component via a pivoting connection for movement between an anchoring orientation and a non-anchoring orientation to enable staged installation of the anchor assembly into a wall. The base of the first anchor component includes a forwardly protruding hook, and the base of the second anchor component includes an opening. When the second anchor component is in the anchoring orientation, each wall penetrating extent of the second anchor component protrudes rearwardly of the base of the first anchor component, and the hook of the first anchor component extends through and protrudes forwardly out of the opening in the base of the second outer component.

The details of one or more embodiments are set forth in the accompanying drawings and the description below. Other features, objects, and advantages will be apparent from the description and drawings, and from the claims.

BRIEF DESCRIPTION OF THE DRAWINGS

FIGS. 1-9 show one embodiment of an anchor assembly;
FIG. 13 shows an end elevation of the wall penetrating retainer of FIG. 12;
FIG. 14 shows a partial side elevation of the retainer of FIG. 12 engaged within a wallboard;
FIG. 15 shows another embodiment of an anchor assembly;
FIGS. 19A and 19B show another embodiment of an elongated anchor assembly;
FIGS. 20A-20C show underside views of the anchor assembly of FIGS. 19A and 19B.

FIGS. 33A-33C show another embodiment of an anchor assembly; and

DETAILED DESCRIPTION

Figure 6:
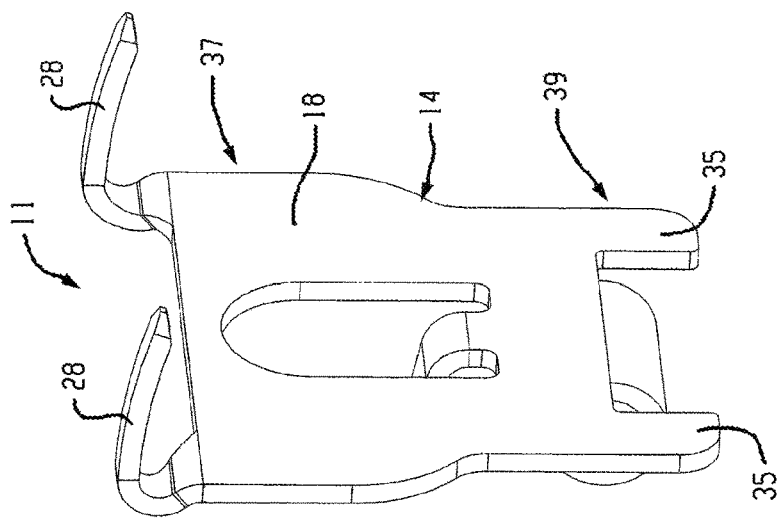

In the drawings and description of various anchor embodiments below, the term wallboard is generally used to refer to the most common wallboard such as drywall, but it is recognized that the anchor components could be suitable for any other friable wallboard material, such as dense corks or foams or other materials that can crumble. Accordingly, the term wallboard as used herein is intended to broadly encompass, for example, both typical drywall (aka plasterboard and gypsum board) and such other friable wallboard materials.

Referring to FIGS. 1-9, an anchor assembly 10 is shown. The anchor assembly 10 includes a pair of anchor components 11 and 13 pivotably engaged with each other so that anchor component 13 can move between a non-anchoring orientation (e.g., FIG. 1) and an anchoring orientation (e.g., FIG. 2) relative to anchor component 11. Anchor component 11 includes a base 14 having front 16, back 18, top 20, bottom 22, left 24 and right 26 sides. In the illustrated configuration the base 14 is formed by a base plate (e.g., metal plate), the front side 16 and back side 18 are formed by the substantially planar front and rear surfaces of the base plate, and the top side 20, bottom side 22, left side 24 and right side 26 are formed by respective edges of the base plate. However, it is recognized that different configurations for the base 14 are possible as will be evident from other embodiments described below. One or more wall penetrating retainers 28 (in the illustrated case a pair of spaced apart retainers) extend from the base 14, each retainer having a corresponding wall penetrating extent 29 with a primarily downwardly curved configuration as will be described in greater detail below.

Anchor component 13 includes a base 114 with front 116, back 118, top 120, bottom 122, left 124 and right 126 sides. As used herein the references front and back in relation to the anchor component 13 refer to portions of the anchor component 13 when in its anchoring orientation. In the illustrated embodiment base 114 is also formed by a base plate, which may be referred to as the outer plate in the context of the overall anchor assembly. Anchor component 13 is pivotably connected to the anchor component 11 (e.g., by way of a hinge connection 70 toward the bottom of the base plate and the bottom of the outer plate). The plates may, by way of example, be metal plates such as spring steel, but variations are possible. Likewise, bases that are not of plate construction are contemplated. The hinge connection 70 enables the anchor component 13 to move between the anchoring orientation (e.g., FIGS. 2 and 9) relative to the anchor component 11 and a non-anchoring orientation (e.g., FIGS. 1 and 8) relative to the anchor component 11.

Figure 10:
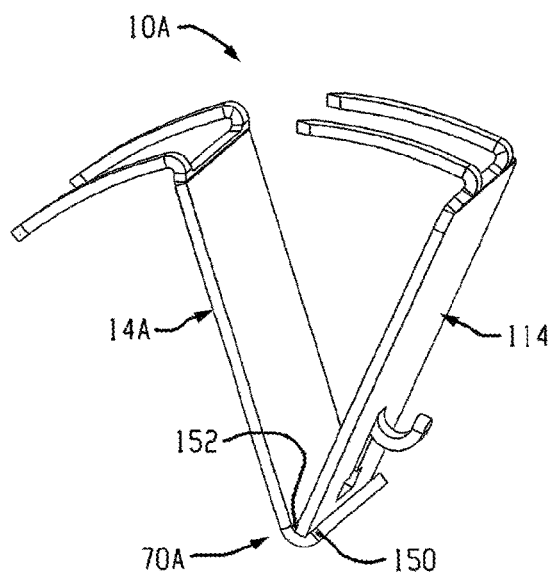
FIG. 10 shows another embodiment of an anchor assembly.

The illustrated embodiment of FIGS. 1-9 shows the hinge connection 70 between the outer plate and the base plate as a closed hinge connection (i.e., one in which the hinge is configured to prevent the two pieces from being readily separated). The hinge connection 70 is formed by a hinge loop 74 formed by looped material of the base plate 14, where the hinge loop 74 captures a hinge pin 76 formed by a strip of the base plate 114 that bounds one side of an opening 78 in the base plate 114. Notably, the top portion 80 of the hinge loop 74 is formed as a flat (with little or no curve), which facilitates formation by progressive stamping. Of course, alternative embodiments for hinge connections are possible. For example, referring to FIG. 10, an anchor assembly 10A is shown in which a base plate 14A and an outer plate 114A engage each other by way of an open hinge connection 70A achieved by an upwardly turned lip 150 at the bottom of the base plate to form a seating groove 152 into which the bottom edge of the outer plate 114A may be positioned as shown. The groove 152 provides a stable pivot surface to facilitate pivot of the outer plate 114A relative to the base plate 14A during anchor installation (as will be described in more detail below relative the embodiment of FIGS. 1-6), while at the same time enabling the outer plate 114A to be removed from the base plate 14A by pulling the outer plate 114A upward and out of the groove 152. In this open hinge configuration, the orientation shown in FIG. 10 represents a non-anchoring orientation of the outer plate 114A of the anchor assembly 10A.

Figure 11:
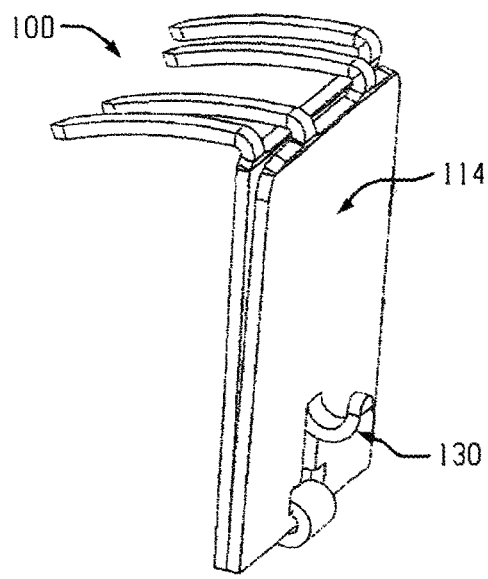
FIG. 11 shows another embodiment of an anchor assembly.

Referring again to FIGS. 1-9, in the anchoring orientation, the back side 118 of the outer plate 114 is positioned alongside and forward of the front side 16 of the base plate 14 to cover a significant portion of the base plate 14, and one or more wallboard penetrating retainers 128 that extend from the base plate 114 each have a wall penetrating extent 129 the protrudes rearwardly of the base plate 114 and has a downwardly curved configuration. In the non-anchoring orientation the outer plate 114 hangs below the base plate 14. A hook element 30 extends forwardly from the anchor assembly when the outer plate 114 is in the anchoring orientation. In the illustrated embodiment, the hook element 30 protrudes forward of the front side 16 of the base plate 14, and extends through an opening 131 in the outer plate 114. In this arrangement, when an item is hung on the hook element (e.g., a picture wire or bracket engaged on the hook element) the component that engages with the hook element 30 will operate in conjunction with the hook element 30 to inhibit rotation of the outer plate 114 from the anchoring orientation toward the non-anchoring orientation. In an alternative embodiment, the hook element may extend from the outer plate 114, per the anchor assembly 10D of FIG. 11 where a hook element 130 is formed by a forwardly curved portion of the outer plate 114.

Although the number of wallboard penetrating retainers can vary, in the illustrated embodiment two wallboard penetrating retainers 28 extend from the base plate 14, and two wallboard penetrating retainers 128 extend from the outer plate 114. Notably, the two wallboard penetrating retainers 28 are laterally spaced apart by a distance D1 and the two wallboard penetrating retainers are laterally spaced apart by a distance D2, where D2 is smaller than D1. Thus, as viewed from the front elevation of FIG. 7, the wallboard penetrating retainers 128 are positioned between the wallboard penetrating retainers 28 when the anchor component 13 is in the anchoring orientation. In the illustrated implementation, the retainers 28 and the retainers 128 are all located at substantially the same height when the anchor assembly achieves its final install position in the wallboard. In particular, and as best seen in FIG. 9, one or more portions of the back side of the base 14 of the anchor component lie in a wall mount plane (e.g., represented by front wall surface 12A) and respective portions of the wall penetrating retainers 28 and 128 that lie in the wall mount plane when anchor component 13 is in the anchoring orientation are positioned at substantially the same height as reflected at region 82. However, it is recognized that variations are possible, such as an arrangement in which the retainers 128 are located higher than the retainers 28 or an arrangement in which the retainers 28 are located lower than the retainers 128. Moreover, in another alternative variation the distance D2 between retainers 128 could be larger than the distance D1 between retainers 28, so that, as viewed from a front elevation, the wallboard penetrating retainers 28 are positioned between the wallboard penetrating retainers 128 when the outer plate 114 is in the anchoring orientation.

As shown, the back side 118 of the outer plate 114 may at least in part abut and/or seat against the front side 16 or other part of the base plate 14 when the anchor component 13 is in the anchoring orientation. This arrangement provides for stability of the overall anchor assembly and enables a user to readily recognize when the anchor assembly is fully installed. Such contact may be achieved be engaged planar surfaces, or one or more discrete contact points of contact between the back of the outer plate and the base plate, and in some cases very small contact points or area could be provided between the two. In other arrangements some contact points between the outer plate 114 and the wall surface 12A could be provided for stability.

In the illustrated embodiment, the wallboard penetrating retainers 128 of the outer plate 114 pass over the top side or edge of the base plate 14 when the anchor component 13 is in the anchoring orientation. However, it is recognized that other variations are possible, such as the inclusion of one or more openings in the base plate 14 through which the retainers 128 extend when the anchor component 13 is moved to the anchoring orientation, or such as the retainers 128 passing around the left and right sides of the base plate 14.

The basic two anchor component arrangement provides for an advantageous and user friendly method for installation. In particular, referring to FIGS. 8-9, a method of installing the anchor assembly 10 includes placing the bottom side 20 of the base plate 14 adjacent a front surface 12A of the wallboard 12 with a distal end of the wallboard penetrating retainers 28 in contact with the front surface 12A (as schematically represented by dashed line form of anchor component 11) and with the anchor component 13 in a non-anchoring orientation as shown in FIG. 8. Pressure P is applied to the base plate 14 (preferably by the user's thumbs, but alternately a tool could be used) to rotate the wallboard penetrating extents 29 of the retainers 28 into the wallboard until the back side 16 of the base plate 14 seats against the front surface 12A of the wallboard. Next, the anchor component 13 is pivoted upward, per arrow 72, until a distal end of the wallboard penetrating retainers 128 of the outer plate 114 comes into contact with the front surface of the wallboard. Pressure can then be applied to the outer plate 114 to rotate the wallboard penetrating extents 129 of the retainers 128 into the wallboard (in a similar manner to that described above) until the anchor component 13 achieves the anchoring orientation and final install position shown in FIG. 9. This two stage method of retainer penetration results in an anchor assembly with a suitable number of retainers to hold larger weights without requiring excessive forces to move the retainers into the wall.

Figure 5:
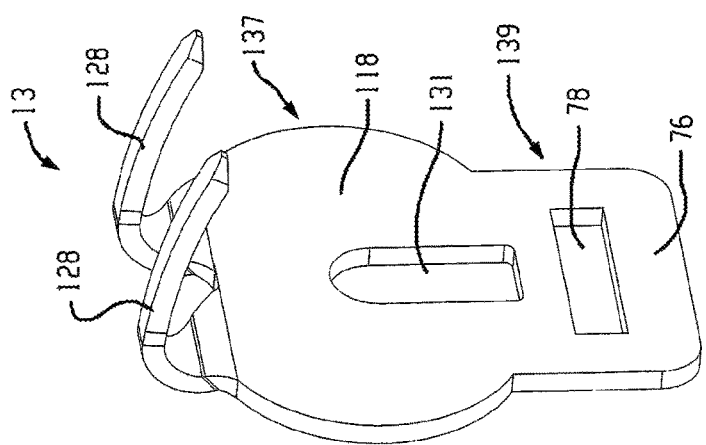
Figure 4:
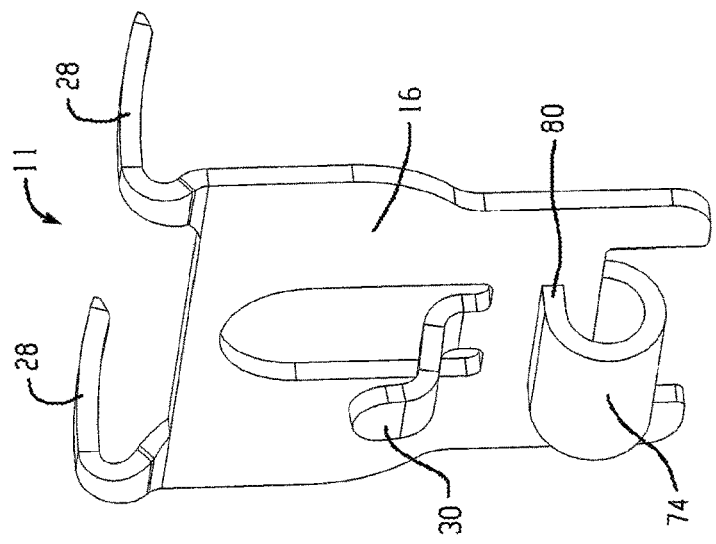

In the illustrated anchor assembly 10, and as best seen in FIGS. 5 and 6, the base 14 includes an upper head portion 37 and a lower body portion 39 (e.g., formed in part by spaced apart stabilizing legs 35), and the base 114 includes an upper head portion 137 and a lower body portion 139. The stabilizing legs 35 extend away from the locations of wall penetrating retainers 28 and can provide for better seating of the distal side or bottom side of the base 14 against an uneven wall surface (e.g., a wall surface that has been textured). Each stabilizing leg 35 is also substantially aligned laterally with a respective one of the wall penetrating retainers, and the hinge loop 74 is disposed between the legs 35. A lateral width of each of the head portion 37 is greater than a lateral width of the body portion 39, and a lateral width of the head portion 137 is greater than a lateral width of the body portion 139. Each head portion 39, 139 is located vertically between the respective wall penetrating retainers 28, 128 and the body portion 39, 139. The head portion 137 includes left and right side lobes or ears 137', which extend laterally outward beyond the lateral location of the respective left and right retainers 128. The two lobes form respective left and right thumb capture zones (e.g., proximate the upper left and right corners or regions of the anchor component base where the retainers are located) that enable an install force applied by a user's thumbs to be substantially directed to the retainers 128 (e.g., an install force applied at the left thumb capture zone is substantially directed to the left wall penetrating retainer and an install force applied at the right thumb capture zone to be substantially directed to the right wall penetrating retainer). In the case of anchor component 11, the head portion has left and right thumb capture zones formed by the left and right sides of the head portion 37. Each thumb capture zone may also be formed with an indentation, embossment and/or stamped outline.

Notably, as mentioned above, the wallboard penetrating extents of the retainers 28 and 128 both have a primarily downwardly curved configuration when anchor component 13 is in the anchoring orientation. In this regard, the wallboard penetrating extents 29 and 129 are both preferably arcuate. In such implementations, the radius of curvature $R_{28}$ defined of the arcuate extents 29 may have a center point 34 that is proximate the bottom side of the base plate 14. In particular, the center point 34 of the radius of curvature $R_{28}$ may desirably be positioned at a rear, bottom corner of the base plate where the bottom side of the base plate meets the back side of the base plate as shown. This geometry minimizes the energy and force required to insert the retainers 28, minimizes damage to the wall and results in small wall surface perforations when the anchor is removed. For similar reasons, the wallboard penetrating retainers 128 may have a radius of curvature $R_{128}$ with a center point 134 substantially aligned with the pivot axis of the hinge connection 70, though this pivot axis may move slightly due to play in the hinge. This pivot axis runs substantially parallel to the wall mount plane of the base 14.

In one implementation, each radius of curvature $R_{28}$ and $R_{128}$ may be between about 1.20 inches and about 1.45 inches. However, in the anchor assembly 10 the radius of curvature R128 will be slightly smaller than the radius of curvature R28, resulting in the retainers 128 passing into and within the wall 128 at a slightly more aggressive angle than the retainers 28, as best seen in FIG. 9.

Where the retainers 128 on the outer plate 114 are the same size as the retainers 28 on base plate 14, when the outer plate is in the anchoring orientation, a spacing between the back side of the base plate 14 and a distal end of the wallboard penetrating retainers 28 will be slightly greater than a spacing between the back side of the base plate 14 and a distal end of the wallboard penetrating retainers 128, with the difference being substantially the same as the thickness of the base plate 14. However, other variations are possible, such as where retainers 128 are slightly longer than retainers 28 so that the distal ends of both the retainers 28 and 128 end up at substantially the same depth (measured perpendicular to wall surface 12A) in the wall 12, as will described in more detail below.

Referring now primarily to FIGS. 8 and 9, in the illustrated embodiment, each wall penetrating retainer 28 and 128 departs its respective base with an initial forward progression reflected by angle θ1 and then turns back (e.g., with the illustrated relatively sharp curve) to define a rearward and downward progression along the wall penetrating extent 29, 129 (e.g., having a primary arcuate shape as described above). By way of example, angle θ1 (e.g., taken relative to a plane parallel to the wall mount plane at the back side of the base 14) may be between about 3 degrees and about 30 degrees (such as between about 10 degrees and about 20 degrees or between about 15 degrees and about 25 degrees), though variations are possible. The initial forward progression can be achieved by a slight forward bend in the entire top edge of each base, or can be achieved by having only the retainers bend forward as they leave the top edge of the base plate. In the illustrated embodiment the initial portion of each retainer is flared as it leaves the base. This forward progression feature is advantageous because it provides clearance for a generous retainer bend-radius at the juncture of the retainer and the base plate to prevent stress cracking at this point of maximum bending load while assuring that when fully inserted the rear side of the base plate can land flush with the wall. In this regard, the initial portion of each wall penetrating retainer 28, 128 that is forward of the back side of the respective base 14, 114 curves forward and then curves rearward as shown, and a radius of curvature at every point along the initial portion may be no less than 100% (e.g., no less than 125%) of the plate thickness. The wall penetrating extent 29, 129 of each retainer extends generally from the wall mount plane to the distal end of the retainer.

Notably, the initial forward progression feature described above also displaces or offsets the retainers 28 from the base 14 and the retainers 128 from the base 114. In fact, in the illustrated embodiment although the wall penetrating extents 29 and 129 are located rearward of the base 14 (when anchor component 13 is in the anchoring orientation), the extents 29 and 129 are not located directly behind the base 14, which aids in pull-out retention by providing a greater vertical distance between the retainers and the bottom side of the base 14 about which an installed anchor will seek to pivot when loaded.

In order to facilitate anchor installation, the wall penetrating retainers 28 and 128 can also be configured with other advantageous features.

For example, to facilitate manual wallboard penetration and passage without tools, utilizing thumb force only (e.g., applied at the thumb capture zones), the wallboard penetrating retainers 28 and 128 may be formed with a relatively smooth external surface finish (e.g., achieved by polishing, painting or plating). In this regard, the surface of the wallboard penetrating retainers 28 and 128 can be manufactured with or modified to a maximum average surface roughness of about 20 μinch (e.g., in some cases n a maximum average surface roughness of about 15 μinch). In one implementation, just the wallboard penetrating extent of each of the wallboard penetrating retainers is worked, processed or otherwise formed to achieve this desired low surface roughness feature in order to reduce manufacturing cost. The latter implementation would reduce install force but maintain friction on the rougher portions of the penetrating retainer to resist removal forces. The retainers may have a polished surface finish and/or a plated surface finish and/or a painted finish and/or a lubricant (e.g., Teflon) incorporated into the surface finish.

Figure 12:
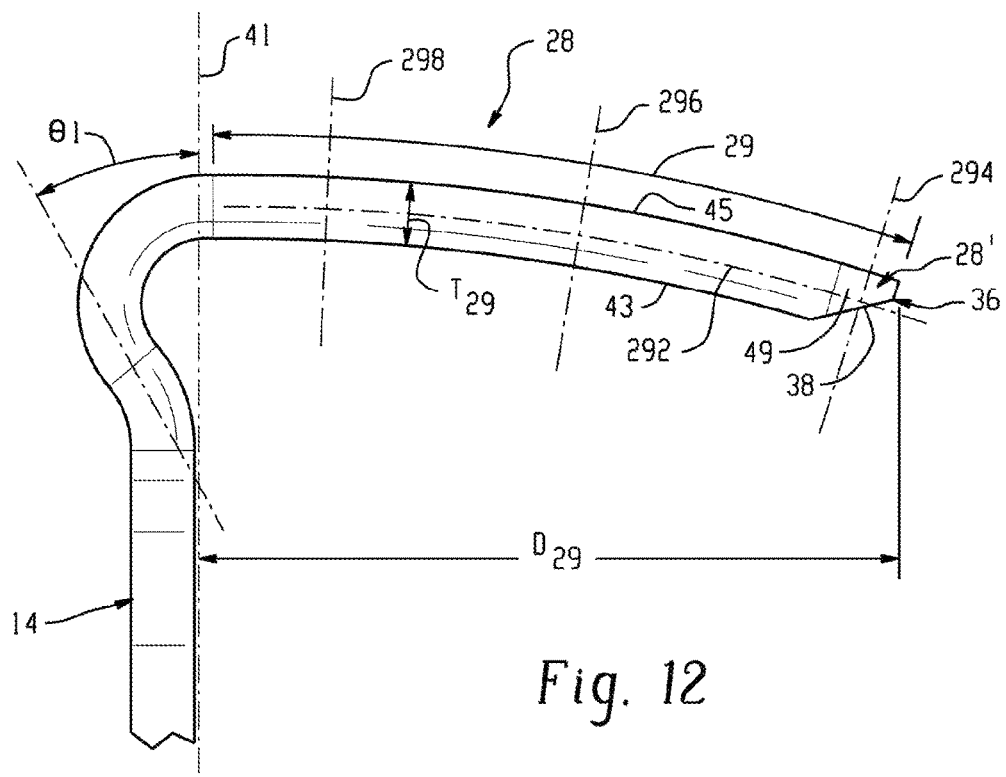
FIG. 12 shows a side elevation of a wall penetrating retainer.

The distal ends of the retainers 28 and 128 may also be configured to facilitate installation. In this regard, and referring to FIGS. 12 and 13, the distal end 28' of each wallboard penetrating retainer 28 includes a pointed tip that is shaped to provide a point 36 when viewed in cross-section taken along a vertical plane running along a length of the wallboard penetrating retainer, where the point 36 is defined by a bevel 38 at a bottom side of the distal end of the wallboard penetrating retainer. In particular, in the illustrated side elevation it is seen that the wall penetrating extent 29 includes a concave curved surface 43 separated form a convex curved surface 45, and lateral an opposed side surfaces 47 that are substantially planar and that extend between the convex curved surface and the concave curved surface. The bevel 36 extends from the concave surface 43 toward the point 36 and little or no bevel extends from the convex surface 45 toward the point 36, to thereby place the point 36 closer to the convex surface of the wall penetrating extent. This type of beveled point is advantageous because the applicants have discovered that including a bevel at the top side of the wallboard penetrating retainer disadvantageously creates a reaction force with the wallboard material that tends to cause the bottom side of the base plate to be pivoted out away from the front surface of the wallboard. Side bevels 49 may also be optionally incorporated to achieve the point 36 as shown. In one implementation, a lateral width $W_{36}$ of the point is no more than 35% of a lateral width $W_{29}$ of a major portion of the wall penetrating extent, and a thickness $T_{36}$ of the point is no more than about 40% of a thickness $T_{29}$ of the major portion of the wall penetrating extent. The above-described configuration may also be applied to the retainers 128.

Proper sizing of the wallboard penetrating retainer(s) can also be used to achieve more user friendly performance of an anchor. In particular, and referring again to FIG. 9, it is seen that in some implementations when the anchor assembly 10 is installed at the front surface of a wall, the distal ends of the wallboard penetrating retainers 28 and 128 may be positioned proximate to a wallboard rear surface 12B without passing through the rear surface. Referring to FIG. 14, in some arrangements of this type, the distal end 28A' of the wallboard penetrating retainer actually contacts an internal side 42 of the paper layer 44 that defines the rear surface of the wallboard but, again, does not pass through the paper layer 44. The distal end of the wallboard penetrating retainer may even cause a localized rearward protrusion 46 in the paper layer 44 at a point of contact with the paper layer but, again, without passing through the paper layer 44. Arrangements of this type, in which the wallboard penetrating retainer is in contact with or proximate the paper layer 44 defining the rear surface 12B without passing through that paper layer are advantageous in that applicants have discovered that it can take five pounds or more of additional force to install an anchor if the distal ends of the retainers must pass through rear paper layer 44 in order to achieve final anchor seating position. For the general consumer/home/residential application, the majority of drywall is ½ inch thick, and therefore the retainers can be sized with this in mind. In such cases, a perpendicular distance D29 of the wall penetrating extent 29 between the wall mount plane 41 and the point at the distal end of the wall penetrating retainer can be no more than 0.50 inches (e.g., between about 0.44 inches and about 0.50 inches for assuring that when the anchor is installed on a wallboard that is ½ inch thick the wall penetrating retainer will approach but not pass through a back side of the wallboard). Of course, in some embodiments the retainers could be longer and pierce the back paper layer of the wallboard. Again, the above-described configuration may also be applicable to the retainers 128 when the anchor assembly 10 is installed with anchor component 13 in its anchoring orientation.

Generally, by properly selecting the cross-sectional size and number of wall penetrating retainers used on each anchor component and/or by incorporating one or more of the above wall penetrating retainer features, each anchor component can be manually inserted into type X gypsum wallboard (with physical characteristics per the ASTM C1396—Standard Specification For Gypsum Board) by positioning the bottom (or distal) side adjacent the wallboard and rotating the anchor upward to move the wallboard penetrating member into the wallboard with a force P (FIG. 8) of no more than 15 pounds per retainer normal to the base plate at the retainer location when the distal ends of the retainers do not penetrate the rear side of the wallboard per design. Measurement of the level of insertion force required can be achieve utilizing a force gage mounted to a rotating fixture so that the measured pressure or force "P" is always proximate to the penetrating retainer(s) and normal to the base plate at the retainer location, with a rotational installation time of about 2.0 seconds where the starting point of rotation is with the distal end(s) of the retainer(s) against the wallboard and the ending point of rotation corresponds to final seating of the anchor. In anchor embodiments having a single retainer (contemplated below), the installation force to final seating of the anchor should typically be 15 pounds total or less. In anchor embodiments having two retainers, the total installation force to final seating of the anchor should typically be 30 pounds total or less. In either case, the required total level of force can advantageously be achieved without the use of tools.

In one example, such low insertion forces for the retainer (s) of a given anchor component may be achieved where the retainers have pointed distal ends as described above and a generally uniform cross-section along the remainder of the wall penetrating extent of the retainer, where an area of the cross-section is no more than about 2.5 mm$^2$. In one example, in the case retainers of rectangular cross-section as suggested in anchor 10, the main segment of the wall penetrating extent of each retainer may be on the order of 0.042 inches by 0.068 inches (e.g., 0.042 inches thick and 0.068 inches wide), resulting in a cross-sectional area of about 0.00286 in$^2$ (about 1.845 mm$^2$). In another example, the main segment of the wall penetrating extent may have a rectangular cross-section on the order of 0.050 inches by 0.075 inches (e.g., 0.050 inches thick and 0.075 inches wide), resulting in a cross-sectional area of about 0.00375 in$^2$ (about 2.419 mm$^2$). Regardless of whether one or multiple retainers are used on any given anchor component, it may be advantageous (e.g., for the purpose of ease of install and/or for the purpose of limiting wall damage) to assure that the total retainer cross-sectional area (e.g., the cross-sectional area of one retainer if only one is used or the total cross-sectional area of two retainers if two retainers are used) of each anchor component is no more than about 5 mm$^2$ (about 0.008 square inches, or in some cases no more than about 6 mm$^2$), where the cross-section of each wall penetrating extent of the retainer is taken perpendicularly to a lengthwise axis 292 (FIG. 12) of the retainer (which axis is curved like the retainer) and is taken at any location along a length of the wall penetrating extent 29 that will embed within a wall (e.g., a cross-section in any of planes 294, 296 or 298). This arrangement facilitates installation by hand (without using tools) and reduced wall hole size that must be repaired after anchor removal.

Advantageously, such retainer sizes, combined with a radius of curvature as described above, provide desired low insertion forces, while at the same time resulting in both relatively small penetration holes in the wallboard and relatively high hanging load capability (e.g., 30 pounds per retainer). Thus, the anchor assembly can be installed in a staged manner without the use of tools (e.g., by user thumb force to rotate each anchor component) and provide a very beneficial load support capability once installed. Moreover, upon removal of the anchor assembly from the wall the size of the hole(s) that are left for repair will be small, which (i) makes it simpler for the novice homeowner to make a clean wall repair and (ii) more readily allows for slight repositioning of the anchor (e.g., in close proximity to the existing holes) if needed.

As mentioned above, other anchor assembly configurations are possible. For example, in the anchor assembly 10C of FIG. 15 anchor component 13C is pivotably connected to anchor component 11C and the base 114C includes both a retainer portion 190 and a connection portion 192, both of which are substantially planar, with the retainer portion 190 and the connection portion 192 angled relative to each other at an angle Φ1 other than 180 degrees. When anchor component 13C is in the anchoring orientation, the retainer portion 190 is oriented substantially parallel with the base 14C and the connection portion 192 plate will angle away from the both the base plate 14C and the retainer portion 190.

Although the illustrated base plate and outer plate are contemplated as monolithic structures (e.g., produced by a progressive forming operation), the retainers could be formed separately (e.g., of wire form) and then attached to the respective plates the anchor components could be formed with snap in place retainers (e.g., wire form retainers that snap into place on metal or plastic plate) or the anchor components could be produced using an overmold process (e.g., an overmold to connect retainers to a plastic plate or an overmold of the metal plate and retainer combination). Moreover, while the embodiments shown herein show each base plate having a single outer plate connected thereto, it is recognized that an elongated base plate could have two or more spaced apart outer plates pivotably connected thereto.

Figure 16:
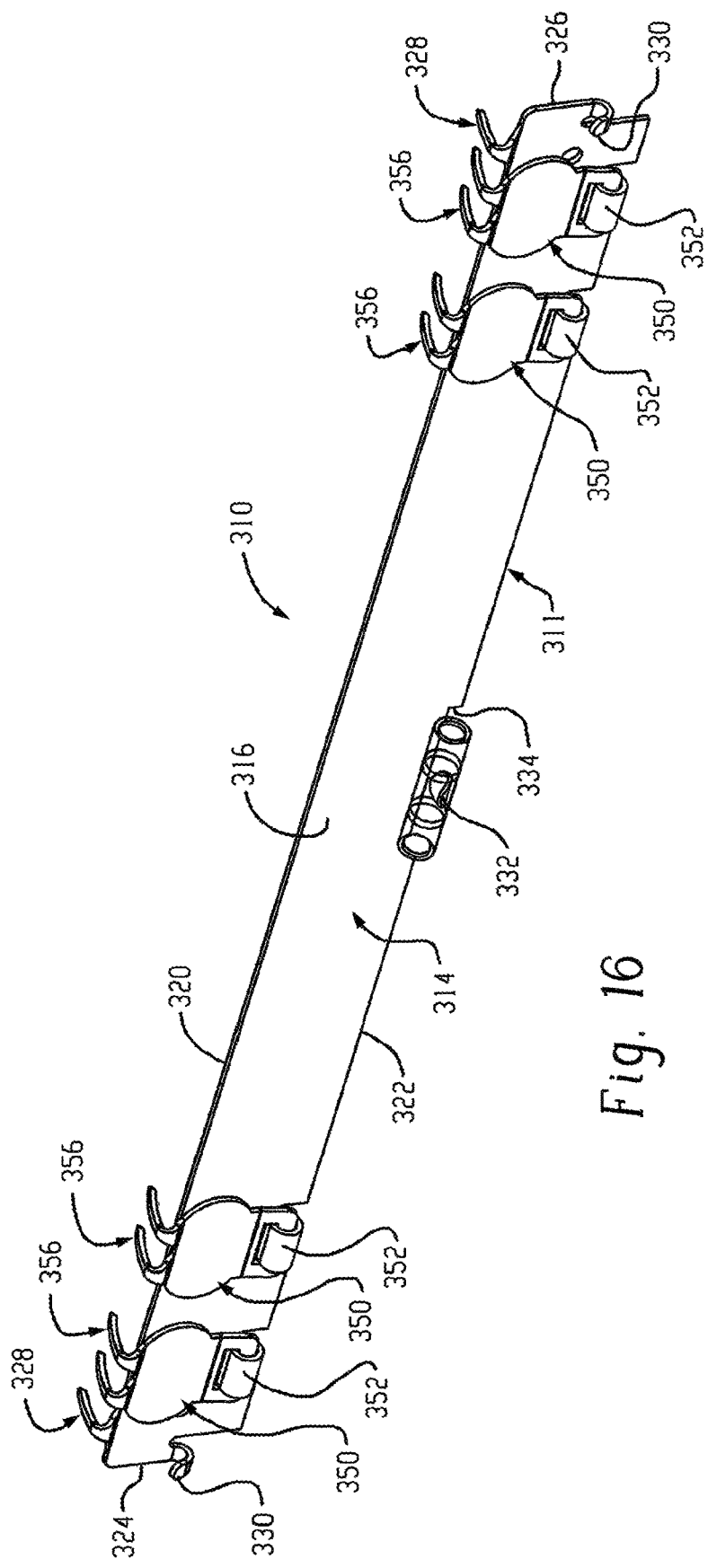
FIGS. 16-17 show an embodiment of an elongated anchor assembly.
Figure 17:
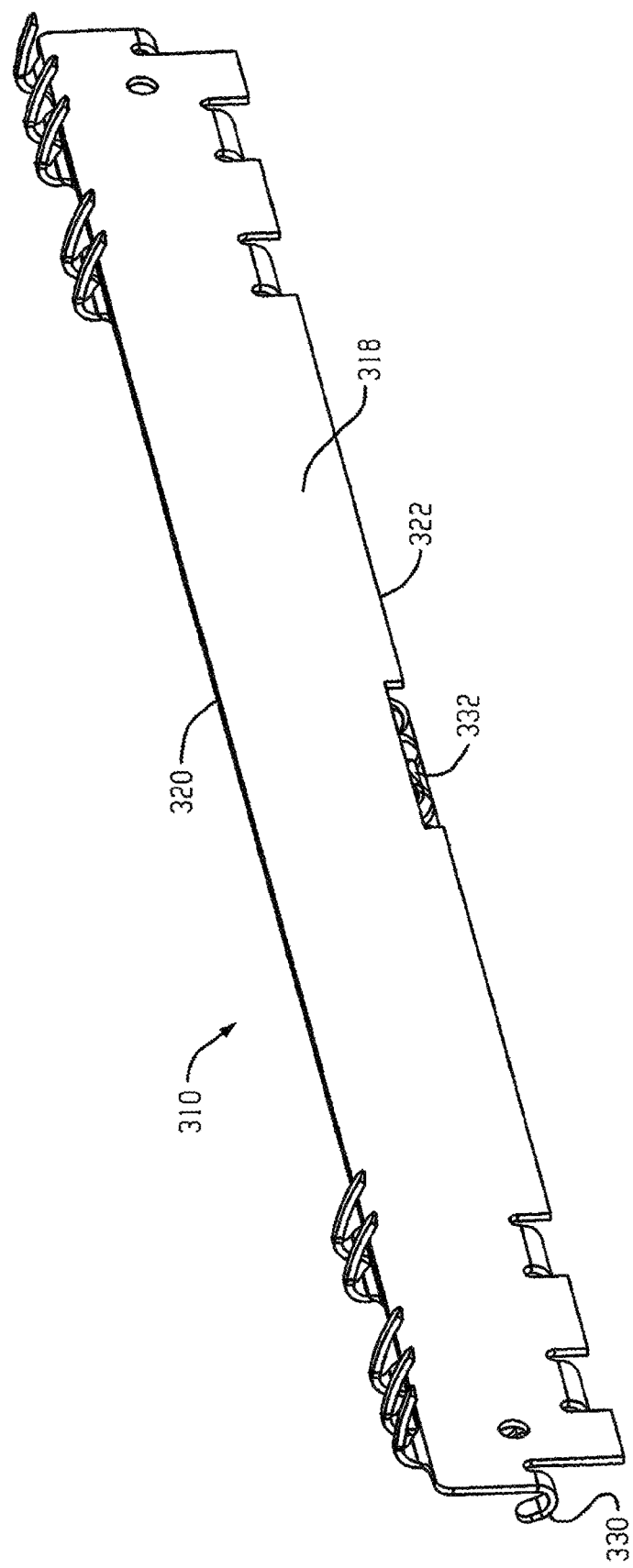

In this regard, and referring now to FIGS. 16 and 17, an embodiment of an anchor assembly 310 including an anchor component 311 with an elongated base member in the form of base plate 314 having front 316, back 318, top 320, bottom 322, left 324 and right 326 sides is shown. One or more wallboard penetrating retainers 328 extend from the base 314 and have wall penetrating extents with a downwardly curved configuration. Here, the retainers 328 are spaced apart towards opposite ends of the base plate and extend from the top side or top edge of the base plate. The base plate 314 includes spaced apart hook elements 330 to facilitate object hanging (e.g., via picture wire engagement with the spaced apart hooks). The base plate 314 may also include a bubble 332 level attached thereto (e.g., inserted within a bubble level support slot 334) or otherwise attached to the base plate 314, such as by adhesive or by a magnet.

Multiple additional anchor components 350 are pivotably connected to the base plate, here by respective hinge loops 352 of the base plate 314. Each anchor component 350 may, by way of example, be of a similar configuration to the anchor component 13 described in detail above. Each anchor component 352 is movable between an anchoring orientation (shown) and a non-anchoring orientation (not shown, but comparable to the non-anchoring orientation of component 13 above). Notably, each of the anchor component 350 is movable independently of the others for selective engagement with a wall in a staged manner. Each anchor component 350 has at least one (here two) wall penetrating retainer 356 that extends from the base of the component and has a downwardly curved configuration (e.g., with arcuate extents as described above) when the anchor component 350 is in the anchoring orientation.

As mentioned above, the staged application of anchor install enables the overall assembly to resist more loading when installed in a wall, while still enabling each anchor member to be installed in the wall with a reasonable, achievable amount of user force applied manually to the anchor (e.g., by the user's thumbs) without the need for tools. In this regard, for the purpose of wall install the anchor component 311 may first be installed into the wall by rotation about the lower edge of the base plate 314, and the center of the radius of curvature of the retainers 328 substantially aligns with such lower rear corner to facilitate this first stage of installation. Once the anchor component 311 is installed, each anchor component 350 can be rotated from its non-anchoring orientation to its anchoring orientation on an individual basis by applying pressure to the front side of the base of the component 350. The retainers 356 on the anchor components 350 have radius of curvatures with centers substantially aligned within the hinge loops 352. Thus, in the illustrated embodiment with four anchor components 350 pivotable mounted on anchor component 311, a five stage installation is used, one stage for the anchor component 311 and one stage each for the four anchor components 350.

Variations of the above anchor assembly 310 are possible, including variations in which the base plate member includes cutouts that enable the outer plates to seat against the wall when in the anchoring orientation, or variations in which the anchor plates pivotably connect to the upper side of the base plate member so as to be positioned above the base plate member and against the wall when in the anchoring orientation.

Figure 18:
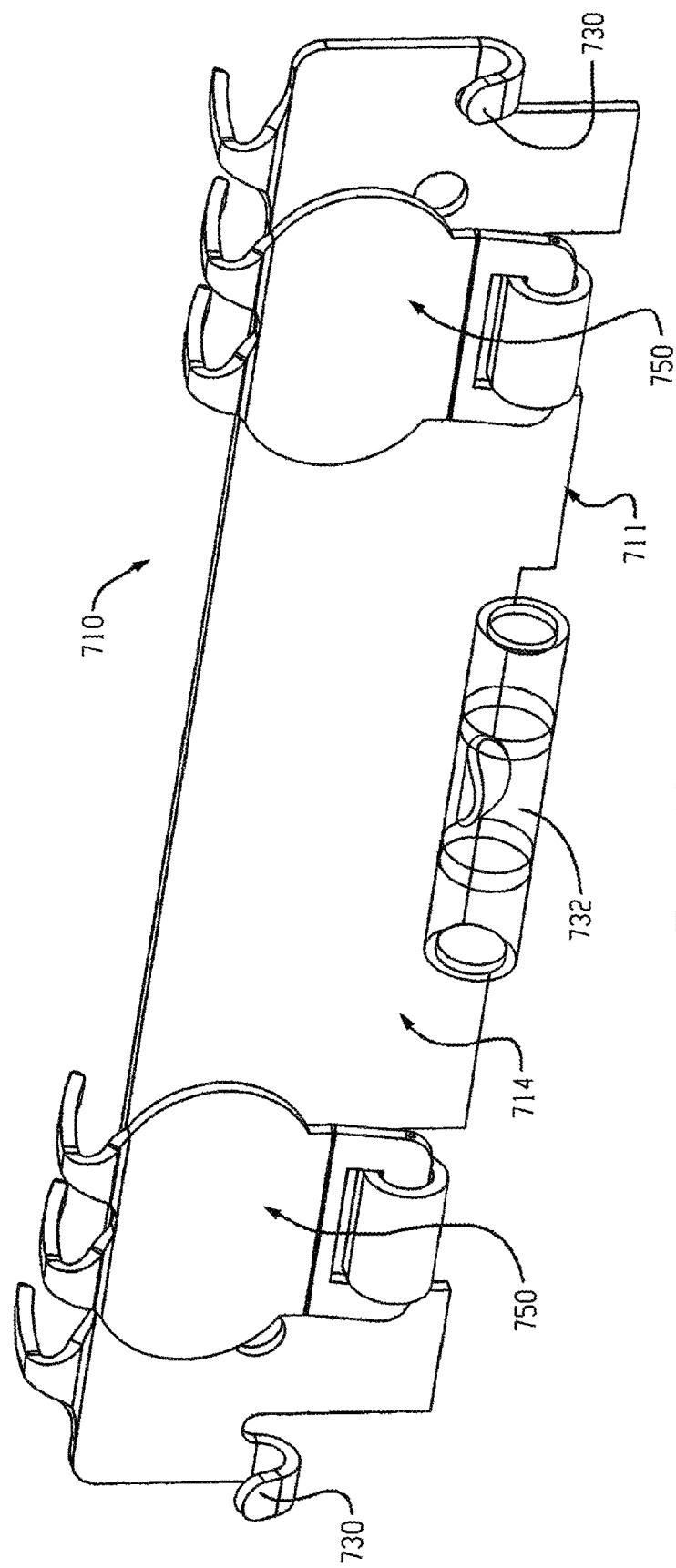
FIG. 18 shows another embodiment of an elongated anchor assembly.
Figure 20A:
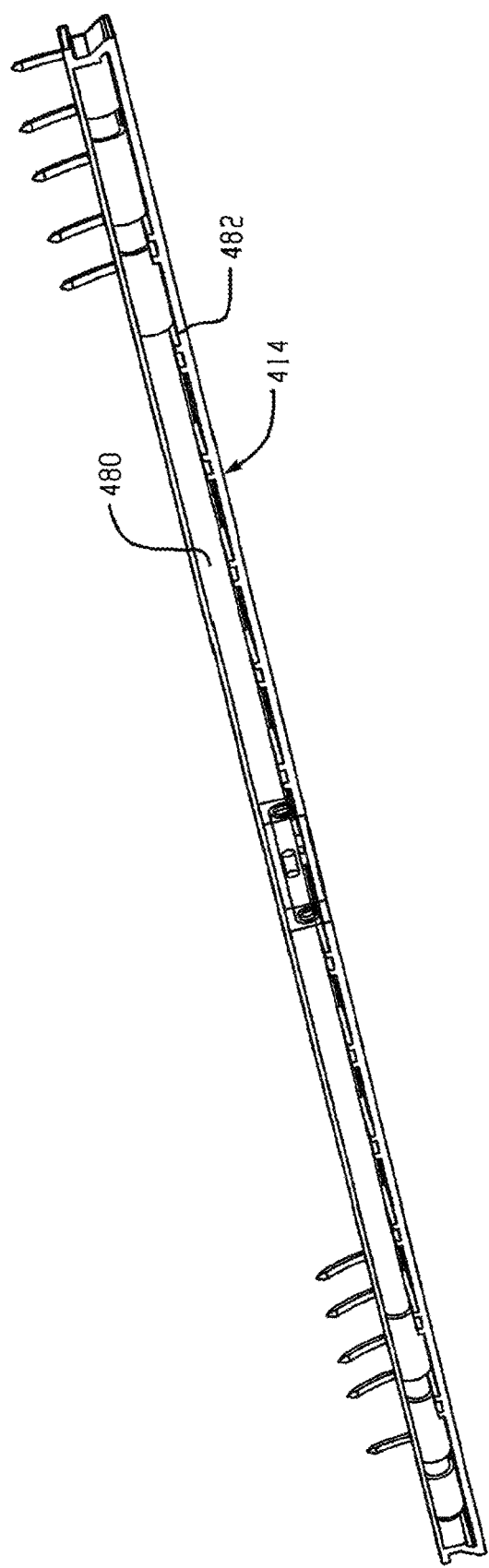

In another embodiment shown in FIG. 18, the anchor assembly 710 is similar to anchor assembly 310 above, except that only two anchor components 750 are pivotably mounted to the elongated anchor component 711. This arrangement provides for a 3 stage installation sequence. A level 732 and hook elements 730 are provided on the base 714 of anchor component 711. By comparison, it is contemplated that the laterally elongated base 714 may be on the order of 5-10 inches in length (side to side), whereas the laterally elongated base 314 may be on the order of 10-20 inches in length (side to side). However, in each case variations are possible.

Referring now to FIGS. 19-25, an embodiment of an anchor assembly 410 including an anchor component 411 with an elongated base member 414 in the form of an elongated plastic body having front 416, back 418, top 420, bottom 422, left 424 and right 426 sides is shown. One or more rearwardly extending wallboard penetrating retainers 428 have a downwardly curved configuration. Here, the retainers 428 are spaced apart towards opposite ends of the elongated base member and extend from spaced apart plate-type primary anchor members 470 that extend upward from the top side of the base member 414. The base member includes an upper edge groove 472 that functions to support objects (e.g., via picture wire engagement with the groove). In the illustrated embodiment the groove also extends downward on the left and right sides of body of the base member. The base member 414 may also include a bubble 432 level attached thereto, here inserted within a bubble level support slot 434 at the front side of the base member.

Figure 21:
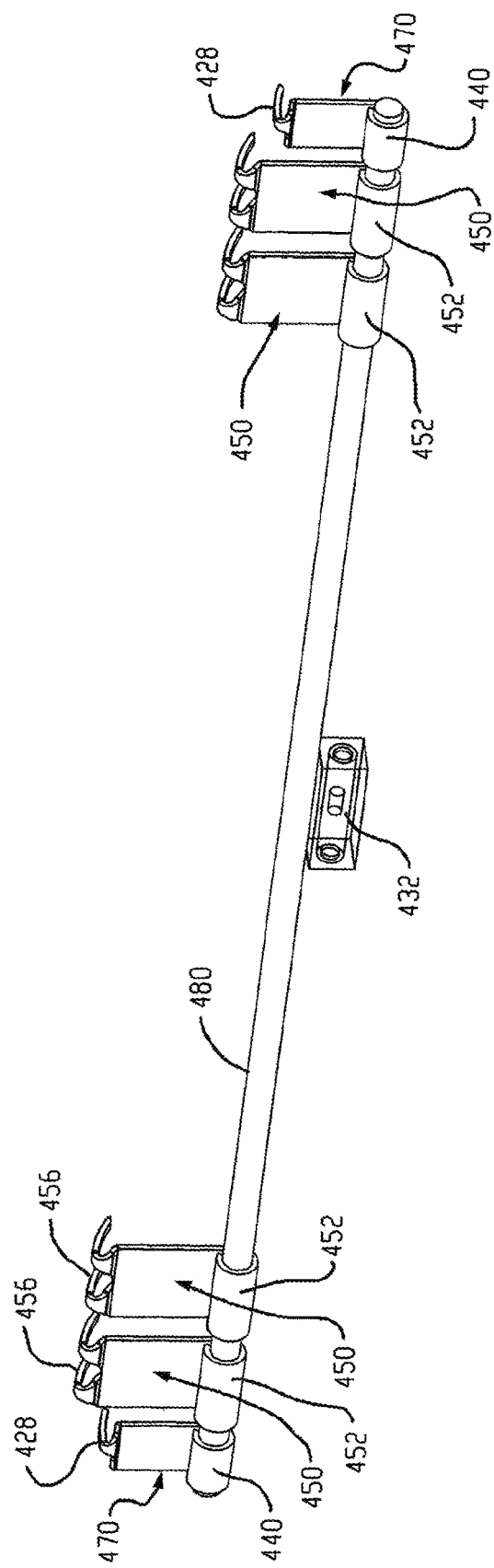
FIG. 21 shows one embodiment of an internal axle system of the anchor assembly of FIGS. 19A and 19B.
Figure 22:
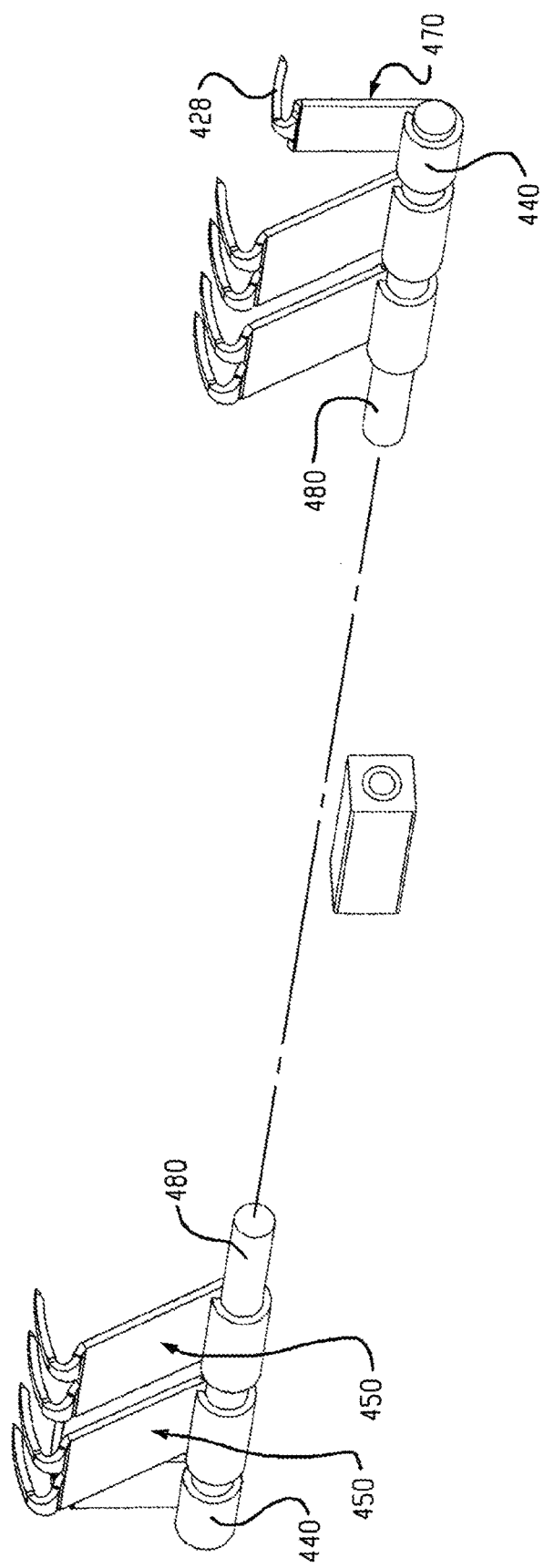
FIG. 22 shows another embodiment of an internal axle system of the anchor assembly of FIGS. 19A and 19B.

The elongated base member may be comprised of a plastic material and includes one or more internal axles 480 (e.g., FIG. 21 represents a single axle embodiment, and FIG. 22 represents a double axle embodiment). In one example the axles may be formed of metal. Referring again to FIGS. 20A-20C, in one embodiment the axles or axles are inserted into a bottom groove or slot 482 of the base member 414 to seat within the base member. The slot may have a series of spaced apart ribs 484 contoured to matingly engage with the outer surface of the axle (e.g., as by a press-fit or a snap-fit). However, other connecting features between the axles and the base member could be used. Each primary anchor may be connected with the axle(s) 480 by way of a hinge ring 440 at the bottom of the anchor. The primary anchors extend upward from respective slots 442 in the base member.

Figure 23:
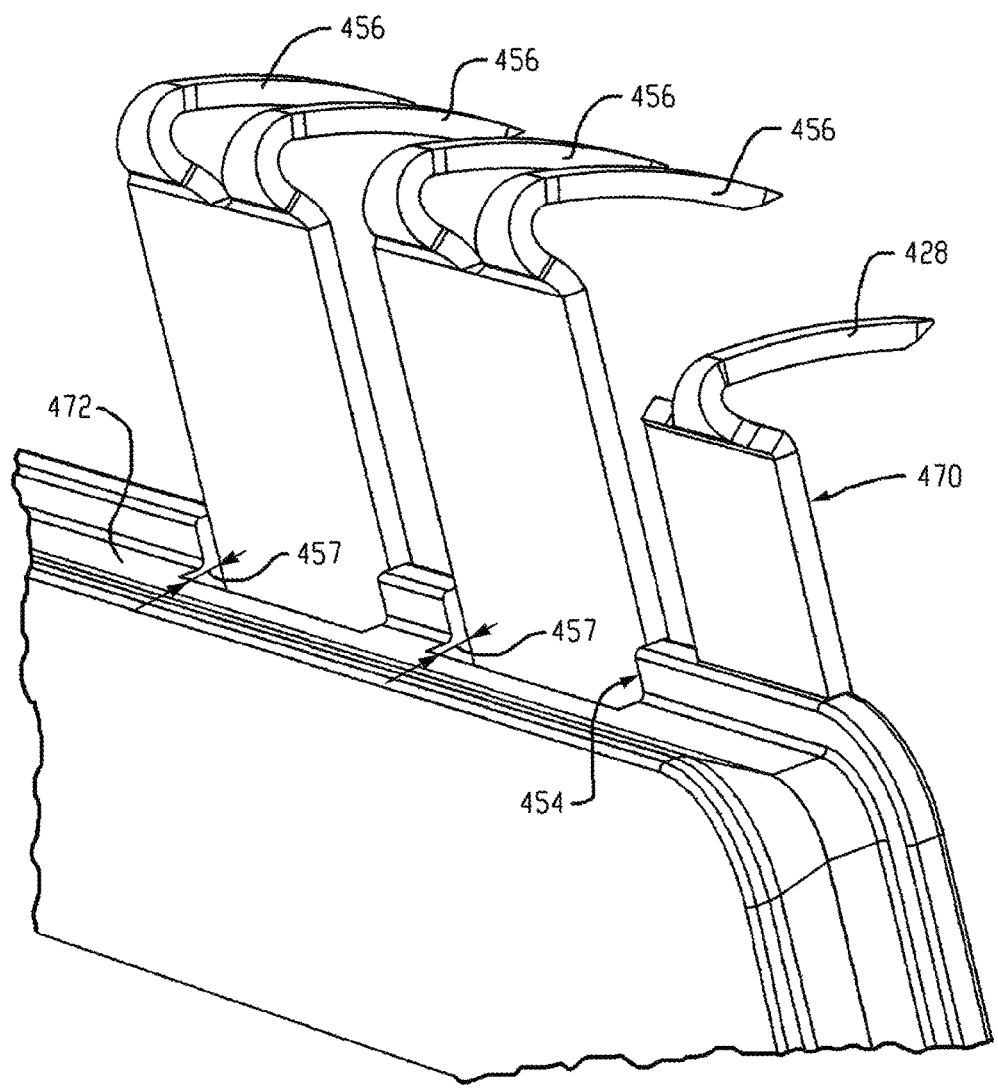
FIG. 23 shows an enlarged partial view of the anchor assembly of FIGS. 19A and 19B.
Figure 24A:
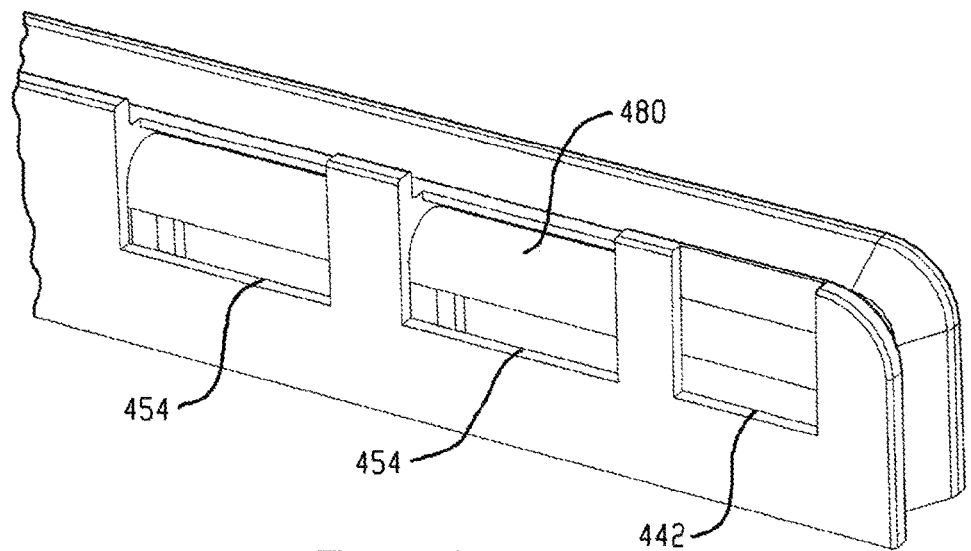
FIGS. 24A and 24B show enlarged partial views of the anchor assembly of FIGS. 19A and 19B with anchor components removed.
Figure 24B:
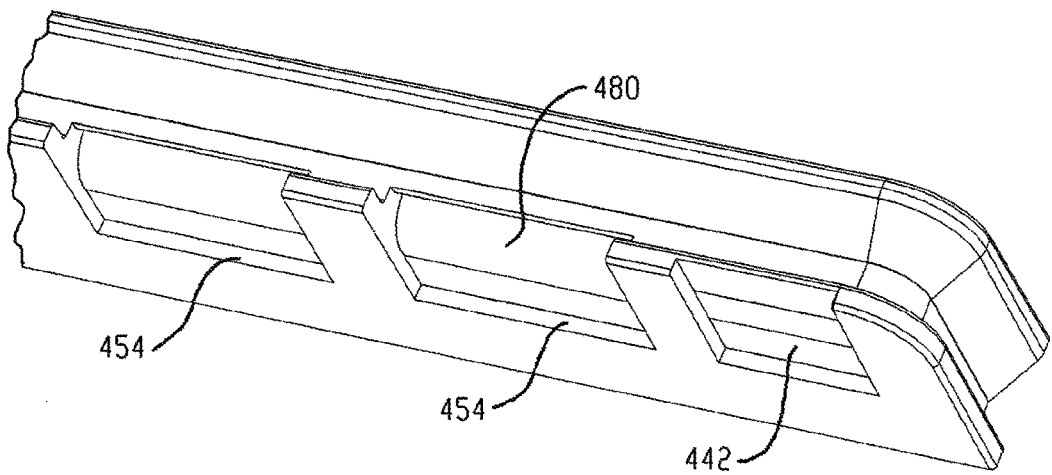

Multiple anchor components 450 are pivotably connected to the anchor component 411 via the base member (e.g., again via respective hinge loops 452 that engage the axle). Each anchor component 450 extends upward from the base member via a respective slot 454 in the base member. Each anchor component 450 is movable between a non-anchoring orientation (shown in FIGS. 25A and 25B) and an anchoring orientation (shown in FIG. 25C). In this regard, the slots 454 are sized to provide sufficient clearance for the anchor components 450 to achieve the non-anchoring orientation as best seen in FIG. 23 where a gap 457 between the front side of the anchor plate and the most forward edge of the slot 454 is shown. By contrast, the slots 442 for the primary anchor do not provide clearance that would enable the primary anchors to pivot forward (e.g., to the left in FIGS. 25A-25C) relative to the anchor component 411 in such a manner. The slots 442 and 454 may be sized and configured to enable the axle and anchor assembly to be inserted into the elongated base member in the manner previously described.

Figure 25C:
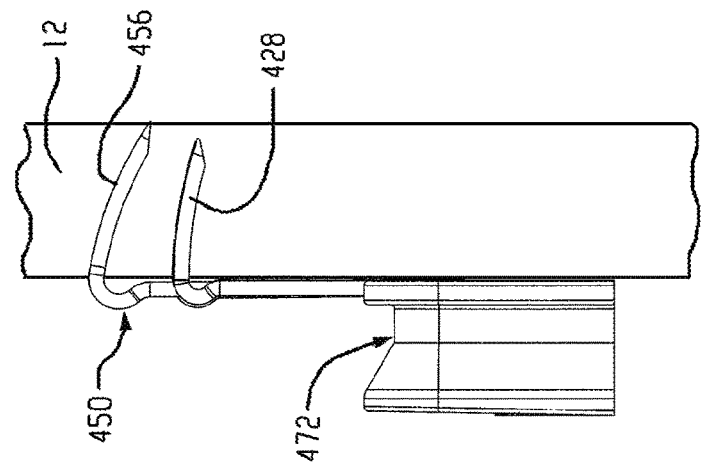
FIGS. 25A-25C depict an install sequence for the anchor assembly of FIGS. 19A and 19B.
Figure 25B:
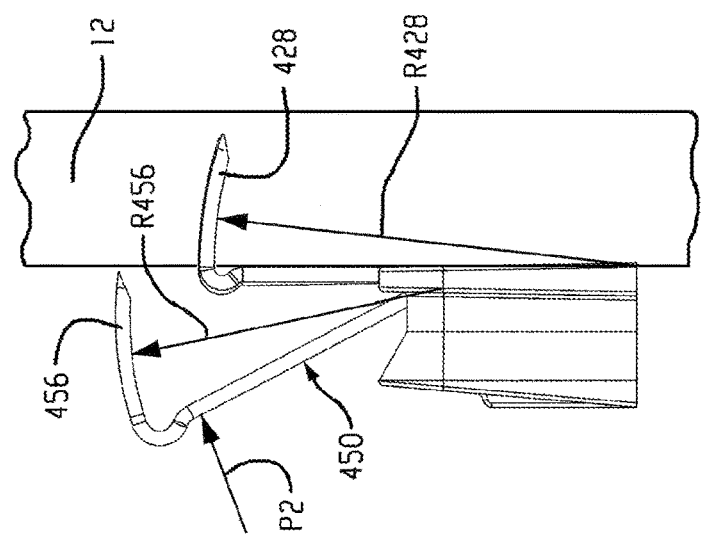
Figure 25A:
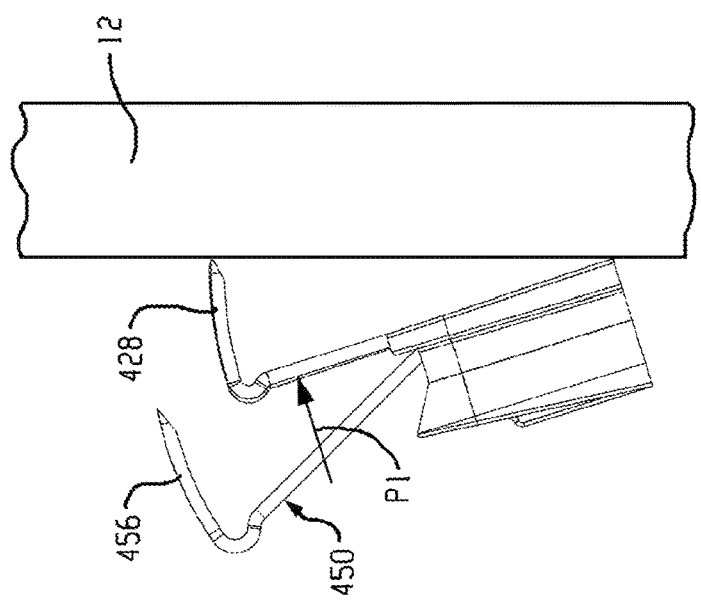
Figure 26:
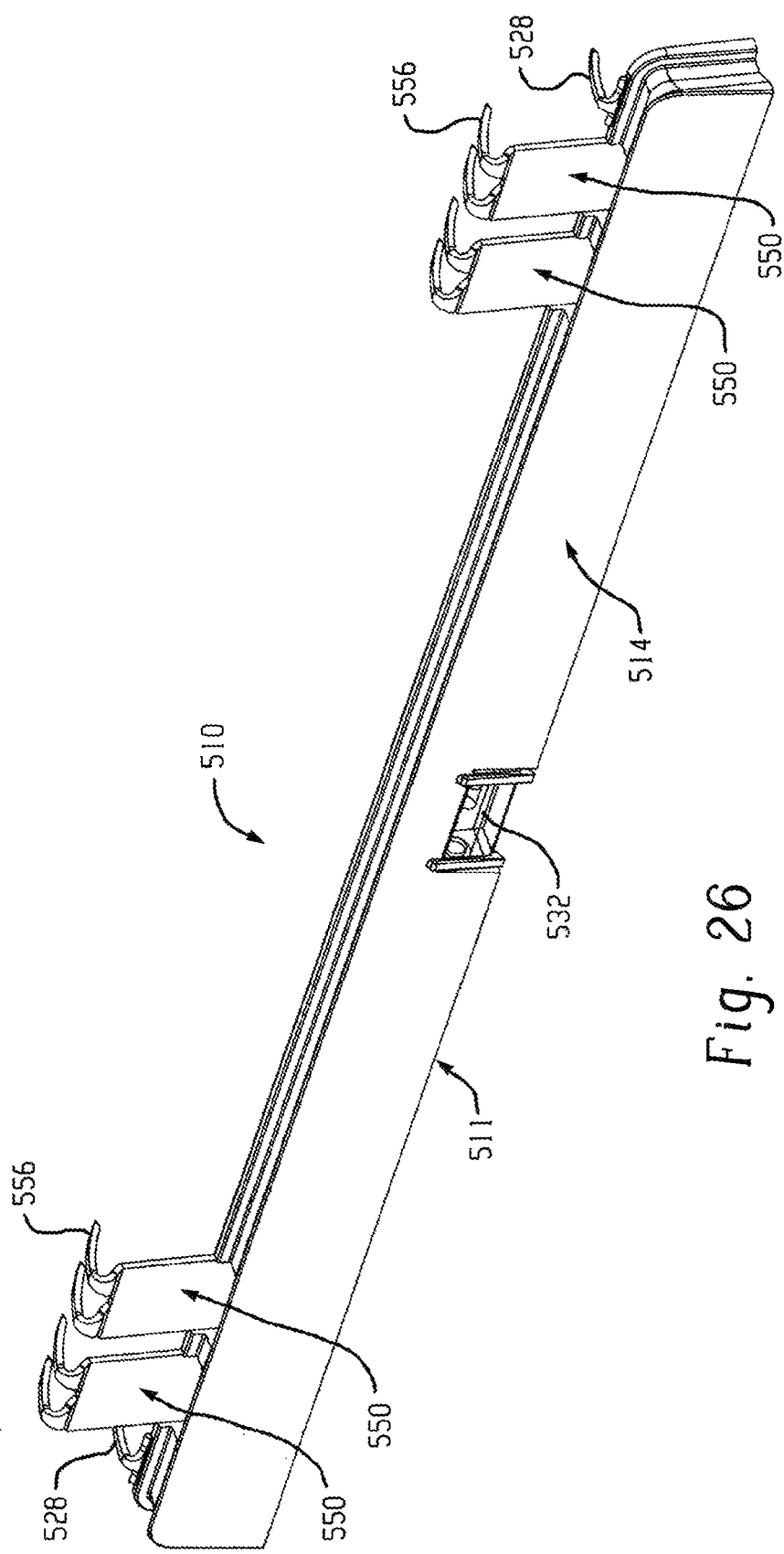
FIGS. 26-30 show another embodiment of an elongated anchor assembly.
Figure 27:
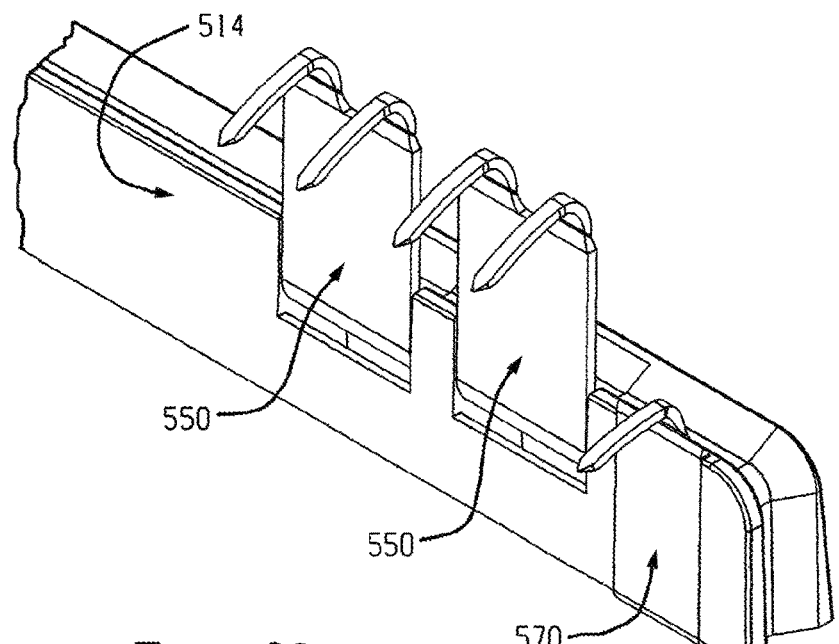

In the illustrated embodiment each anchor component 450 has a back side that sits generally in alignment with the back side of the base member 414 when in the anchoring orientation, such that both will be in contact with the front surface of a wall upon install as shown in FIG. 25C, but other variations are possible. Notably, each of the anchor components 450 is movable independently of the others for selective engagement with a wall in a staged manner. Each anchor component 450 has at least one (here two) wall penetrating retainer 456 that extends rearwardly of the base member 411 and has a downwardly curved configuration when the anchor component 450 is in the anchoring orientation. In this regard, FIGS. 25A-25C depict an install sequence for the anchor assembly, with the elongated base member anchors 470 first being installed into the wall by rotation about the lower edge of the base member 414 (per pressure application P1), and the center of the radius of curvature of the arcuate wall penetrating extents of the retainers 428 substantially aligns with such lower edge to facilitate this first stage of installation as indicated by $R_{428}$ in FIG. 25A. Once the anchor component 411 is installed, each anchor component 450 can then be rotated from its non-anchoring orientation to its anchoring orientation on an individual basis by applying pressure P2 to the front side of the outer plate. The retainers 456 on the anchor components 450 each have arcuate wall penetrating extents with a radius of curvature with a center substantially aligned within the internal hinge axle (e.g. per R$_{456}$ in FIG. 25B).

Notably, in the illustrated anchor assembly 411 the wall penetrating retainers 456 are positioned vertically higher than the retainers 428. The retainers 456 enter the wall 12 at a more aggressive angle than the anchors 428 because R$_{428}$ is larger than R$_{456}$.

Figure 28:
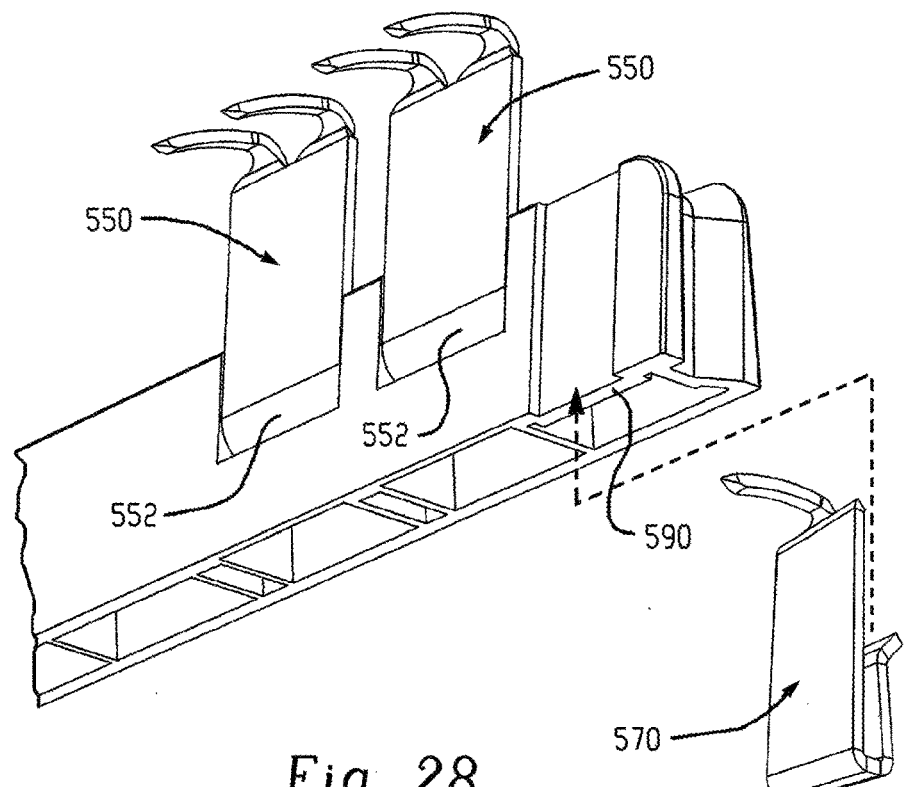
Figure 29:
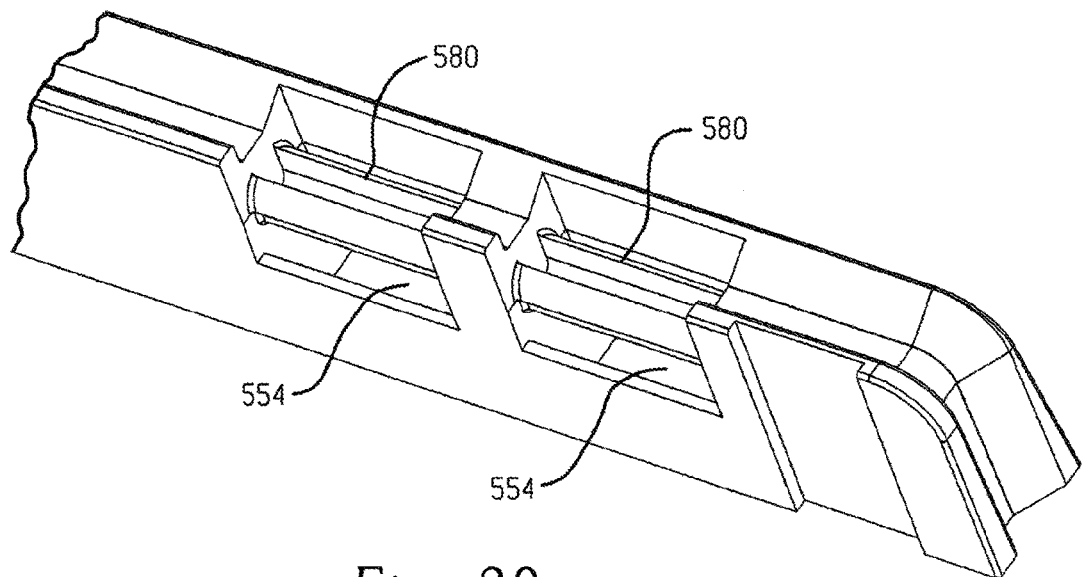
Figure 30:
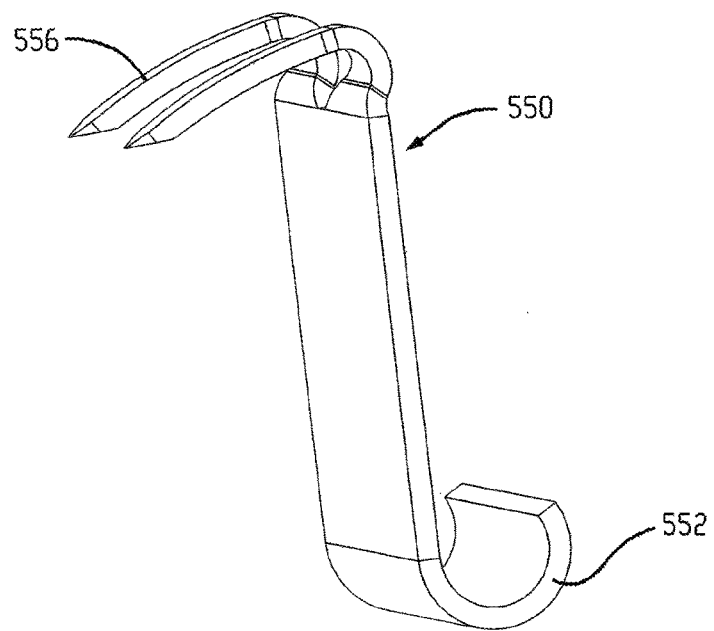

Referring to FIGS. 26-30, another embodiment of an anchor assembly 510 is shown which is similar in configuration to anchor assembly 410, with a number of exceptions. The first involves the manner in which the anchors 570 (with respective retainers 528) are installed on the base member 514 to form anchor component 511. Rather than being engaged with an axle within the base member 514, as best seen in FIG. 28 each anchor 570 has a u-shaped body profile for slidingly engaging with a portion 590 of the body of the base member 514 (e.g., in a press-fit or snap-fit engagement). In addition, as best seen in FIG. 29 the internal axle(s) 580 of the base member is/are of monolithic construction with the base member 514 (e.g., molded with the base member), and the hinge loop 552 of each anchor component 550 (with respective retainers 556) has a more open configuration that allows the hinge loop to be connected to the axle via insertion through the slot 554 in the base member 514. Again, each anchor component 550 is independently pivotable relative to the base member 514 of anchor component 511 in order to provide for the desirable staged installation, and a level element 532 is provided on the base member 514. The center of the radius of curvature of the wall penetrating extents of the retainers 528 is at the lower edge (rear corner) of the base member 514, and the center of the radius of curvature of the wall penetrating extents of the retainers 556 is substantially aligned with the internal hinge axle 580.

Figure 31:
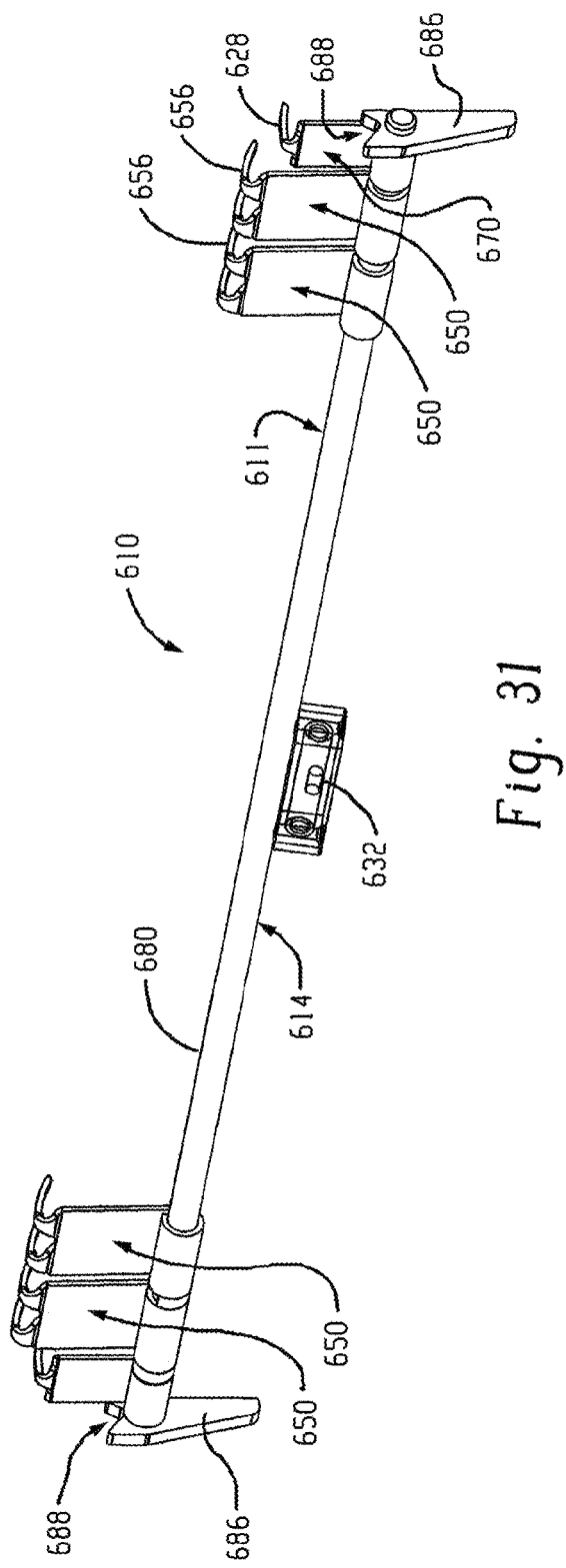
FIGS. 31-32 show another embodiment of an elongated anchor assembly.
Figure 32:
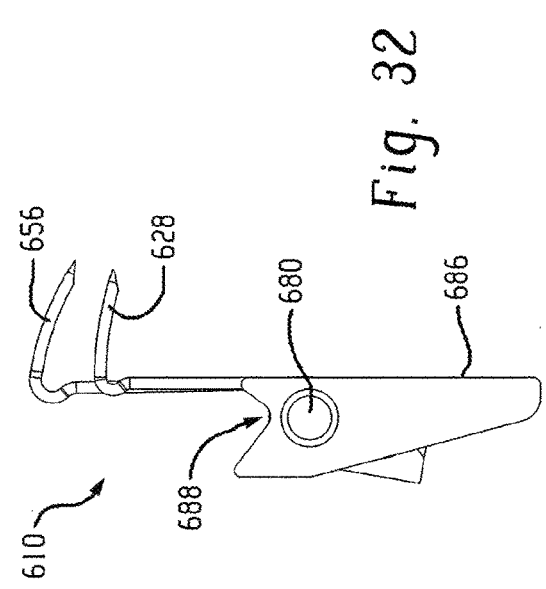

Referring now to FIGS. 31-32, another embodiment of an anchor assembly 610 is shown in which the base member 614 is formed by an axle 680 (e.g., of metal) with stabilizing brackets 686 at each end of the axle 680. Each stabilizing bracket 686 includes an upward facing groove or slot 688 that functions to support objects (e.g., via picture wire engagement with the spaced apart slots 688). Primary anchors 670 engage the axle 680 and provide respective wall penetrating retainers 628 of the anchor component 611, which is formed by the base 614 in combination with the anchors 670. Four anchor components 650 pivotably engage the axle 680 and include respective wall penetrating retainers 656, with the anchor components 650 being pivotable independent of each other, and a level element 632 is mounted on the axle 680. The center of the radius of curvature of the wall penetrating extents of retainers 628 may be at the lower rear corner of the stabilizing brackets 686, and the center of the radius of curvature of the wall penetrating extents of retainers 656 may be substantially aligned with the center line of the axle 680.

It is to be clearly understood that the above description is intended by way of illustration and example only, is not intended to be taken by way of limitation, and that other changes and modifications are possible. For example. Other configurations are also possible.

For example, FIGS. 33A-33C depict an anchor assembly 10B in which a pivot axis of the hinged connection 70B between the anchor component 11B (with base plate 14B and retainers 28B) and the anchor component 13B (with outer plate 114B and retainers 128B) is positioned forward of the base plate 14B to enable the retainers 128B of the outer plate to enter the wall at an even more aggressive angle than the retainers 28B (as best seen in FIG. 13C). This configuration would provide increased load carrying capability. In one example, the pivot axis is displaced forward of the wall contacting portion of the back side of the base plate (e.g., forward of the wall mount plane 41B) by a distance D$_{70B}$ that is at least 3 mm (such as at least 5 mm, or at least 7 mm) or at least 0.15 inches (such as at least 0.25 inches, or at least 0.40 inches), but variations are possible.

Figure 34:
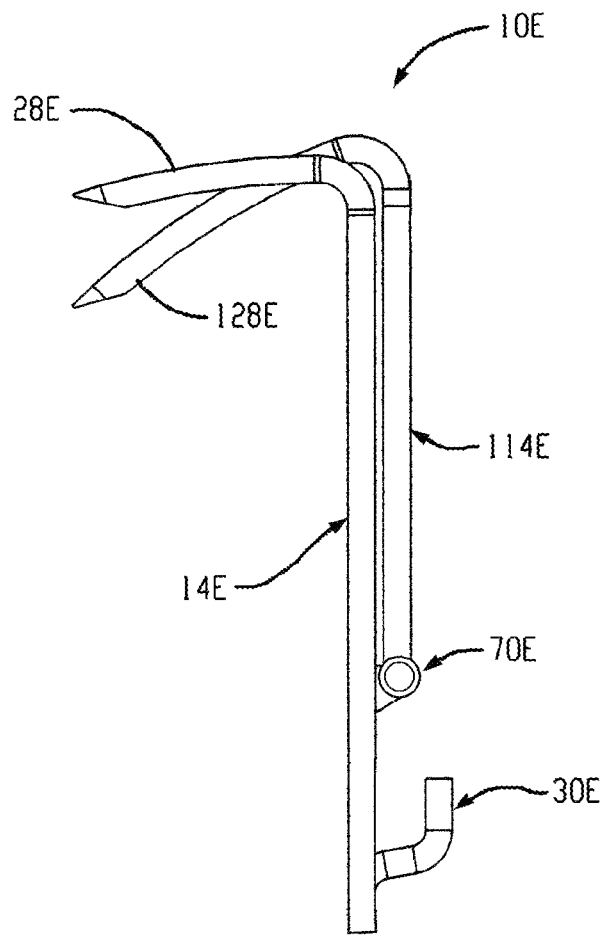
FIG. 34 schematically depicts another embodiment of an anchor assembly.

In another example shown schematically in FIG. 34, an anchor assembly 10E could include a hinged connection 70E between base plate 14E and outer plate 114E that is raised, enabling a hook element 30E to be located on the base plate 14E, with the bottom side of the outer plate 114E being above and clear of the hook element 30E when the anchor assembly is installed. The radius of curvature of the arcuate wall penetrating extents of the retainers 128E of the outer plate may be smaller than the radius of curvature of the acruate wall penetrating extents of the retainers 28E of the base plate in such and embodiment.

Other variations and configurations are possible.

What is claimed is:

1. An anchor assembly for hanging an object on a wall, comprising:
    a first anchor component including a base having front, back, top, bottom, left and right sides, at least one wall penetrating retainer extending from the base and having a wall penetrating extent that protrudes rearwardly of the base and has a downwardly curved configuration;
    a second anchor component including a base having front, back, top, bottom, left and right sides, at least one wall penetrating retainer extending from the base of the second anchor component and having a wall penetrating extent that has a curved configuration;
    the second anchor component pivotably associated with the first anchor component for movement between an anchoring orientation and a non-anchoring orientation, in the anchoring orientation the back side of the base of the second anchor component is positioned at least in part in front of the front side of the base of the first anchor component and the wall penetrating extent of the second anchor component has a downwardly curved configuration and protrudes rearwardly of the base of the first anchor component, in the non-anchoring orientation the second anchor component is pivoted away from the first anchor component; and
    at least one hook element extending forwardly from the anchor assembly when the second anchor component is in the anchoring orientation;
    wherein the base and the wall penetrating retainer of the first anchor component are formed as a monolithic unit of metal plate construction such that one or more portions of the back side of the base of the first anchor component define a wall mount plane of the anchor assembly and the wall penetrating retainer of the first anchor component does not move relative to the wall mount plane.

2. The anchor assembly of claim 1 wherein the second anchor component is pivotably associated with the first anchor component by a hinge connection, an axis of the hinge connection runs parallel to the wall mount plane.

3. The anchor assembly of claim 2 wherein the axis of the hinge connection is spaced forwardly of the wall mount plane by a distance of at least 0.15 inches.

4. The anchor assembly of claim 1 wherein the at least one wall penetrating retainer of the first anchor component comprises first and second wall penetrating retainers extending from the base of the first anchor component, and the at least one wall penetrating retainer of the second anchor component comprises third and fourth wall penetrating retainers extending from the base of the second anchor component.

5. The anchor assembly of claim 4 wherein the first and second wall penetrating retainers have respective distal tips that are laterally spaced apart by a first distance and the third and fourth wall penetrating retainers have respective distal tips that are laterally spaced apart by a second distance, the second distance is different than the first distance.

6. The anchor assembly of claim 5 wherein the first distance is greater than the second distance.

7. The anchor assembly of claim 6 wherein the third and fourth wall penetrating retainers are positioned laterally between the first and second wall penetrating retainers when the second anchor component is in the anchoring orientation.

8. The anchor assembly of claim 5 wherein the first distance is smaller than the second distance.

9. The anchor assembly of claim 4 wherein respective portions of the first, second, third and fourth wall penetrating retainers that lie in the wall mount plane when the second anchor component is in the anchoring orientation are positioned at substantially a same height.

10. The anchor assembly of claim 1 wherein the hook element is located on the front side of the base of the first anchor component, and the base of the second anchor component includes an opening through which the hook element extends when the second anchor component is in the anchoring orientation.

11. The anchor assembly of claim 1 wherein
the base of the first anchor component is formed by a base plate and the front, back, top, bottom, left and right sides of the base of the first anchor component are sides of the base plate;
the base of the second anchor component is formed by an outer plate and the front, back, top, bottom, left and right sides of the base of the second anchor component are sides of the outer plate, and
at least a portion of the back side of the outer plate seats against the front side of the base plate when the second anchor component is in the anchoring orientation.

12. The anchor assembly of claim 11 wherein the front side of the base plate is substantially planar and the back side of the outer plate is substantially planar.

13. The anchor assembly of claim 1 wherein:
at least an end portion of the wall penetrating extent of the first anchor component includes a maximum average surface roughness of no more than about 20 μinch; and
at least an end portion of the wall penetrating extent of the second anchor component includes a maximum average surface roughness of no more than about 20 μinch.

14. The anchor assembly of claim 1 wherein each wall penetrating extent includes:
a convex curved surface separated from a concave curved surface, and lateral first and second side surfaces that are substantially planar and that extend between the convex curved surface and the concave curved surface, wherein a distal end of the wall penetrating extent is shaped to provide a point, wherein the point is defined at least in part by a bevel extending from the concave surface toward the point and little or no bevel extending from the convex surface toward the point such that a distance from the point to the convex surface of the wall penetrating extent is smaller than a distance from the point to concave surface of the wall penetrating extent.

15. The anchor assembly of claim 1 wherein the wall penetrating extent of the first anchor component is arcuate and a center of a radius of curvature of the wall penetrating extent is located substantially at a rear corner of the base of the first anchor component where the bottom side of the base meets the back side of the base.

16. The anchor assembly of claim 15 wherein the second anchor component is pivotably connected to the first anchor component by hinge arrangement, the wall penetrating extent of the second anchor component is arcuate and a center of a radius of curvature of the wall penetrating extent of the second anchor component is located substantially at a hinge axis of the hinge arrangement.

17. The anchor assembly of claim 16 wherein the radius of curvature of the wall penetrating extent of the second anchor component is less than the radius of curvature of the wall penetrating extent of the first anchor component.

18. The anchor assembly of claim 1 wherein:
the base of at least one of the first anchor component or the second anchor component is formed by a base plate that includes a first thumb capture zone proximate an upper left corner and a second thumb capture zone proximate an upper right corner.

19. The anchor assembly of claim 1 wherein:
the first anchor component is configured such that the first anchor component can be manually rotated into type X gypsum wallboard by positioning the bottom side adjacent the wallboard and rotating the first anchor component to move the wall penetrating extent of the first anchor component into the wallboard with a force of no more 15 pounds per retainer normal to the base of the first anchor component at the location of the wall penetrating retainer of the first anchor component;
the second anchor component is configured such that the second anchor component can be manually rotated into type X gypsum wallboard by rotating the second anchor component about a hinge connection to move the wall penetrating extent of the second anchor component into the wallboard with a force of no more 15 pounds per retainer normal to the base of the second anchor component at the location of the wall penetrating retainer of the second anchor component.

20. An anchor assembly for hanging an object on a wall, comprising:
a first anchor component including a base having front, back, top, bottom, left and right sides, at least one wall penetrating retainer extending from the base and having a wall penetrating extent that protrudes rearwardly of the base and has a downwardly curved configuration;
a second anchor component including a base having front, back, top, bottom, left and right sides, at least one wall penetrating retainer extending from the base of the second anchor component and having a wall penetrating extent that has a curved configuration;
the second anchor component pivotably associated with the first anchor component for movement between an anchoring orientation and a non-anchoring orientation, in the anchoring orientation the back side of the base of the second anchor component is positioned at least in part in front of the front side of the base of the first anchor component and the wall penetrating extent of the second anchor component has a downwardly curved configuration and protrudes rearwardly of the base of the first anchor component, in the non-anchoring orientation the second anchor component is pivoted away from the first anchor component;

at least one hook element extending forwardly from the anchor assembly when the second anchor component is in the anchoring orientation;

wherein the wall penetrating retainer of the first anchor component extends from a base edge at the top side of the base of the first anchor component, wherein the wall penetrating retainer of the second anchor component extends from a base edge at the top side of the base of the second anchor component when the second anchor component is in the anchoring orientation, wherein the wall penetrating retainer of the second anchor component passes over the top side of the base of the first anchor component when the second anchor component is in the anchoring orientation so that the wall penetrating retainer of the second anchor component is at a height that is substantially the same as a height of the wall penetrating retainer of the first anchor component.

21. The anchor assembly of claim 20 wherein, when the second anchor component is in the anchoring orientation, a first spacing between the back side of the base of the first anchor component and a distal end of the wall penetrating retainer of the first anchor component is less than a second spacing between the back side of the base of the second anchor component and a distal end of the wall penetrating retainer of the second anchor component.

22. An anchor assembly for hanging an object on a wall, comprising:
a first anchor component including a base having front, back, top, bottom, left and right sides, at least one wall penetrating retainer extending from the base and having a wall penetrating extent that protrudes rearwardly of the base and has a downwardly curved configuration;
a second anchor component including a base having front, back, top, bottom, left and right sides, at least one wall penetrating retainer extending from the base of the second anchor component and having a wall penetrating extent that has a curved configuration;
the second anchor component pivotably associated with the first anchor component for movement between an anchoring orientation and a non-anchoring orientation, in the anchoring orientation the back side of the base of the second anchor component is positioned at least in part in front of the front side of the base of the first anchor component and the wall penetrating extent of the second anchor component has a downwardly curved configuration and protrudes rearwardly of the base of the first anchor component, in the non-anchoring orientation the second anchor component is pivoted away from the first anchor component;
at least one hook element extending forwardly from the anchor assembly when the second anchor component is in the anchoring orientation;
wherein the base and the wall penetrating retainer of the first anchor component are formed as a monolithic unit of metal plate construction, the base of the first anchor component is formed by a base plate, and the wall penetrating retainer of the first anchor component extends from one edge of the base plate with an initial forward progression and then turns back to define a rearward and curved progression.

23. The anchor assembly of claim 22 wherein the base and wall penetrating retainer of the second anchor component are formed as a monolithic unit of metal plate construction, the base of the second anchor component formed by an outer plate, and the wall penetrating retainer of the second anchor component extends from one edge of the outer plate with an initial forward progression and then turns back to define a rearward and curved progression when the second anchor component is in the anchoring orientation.

24. An anchor assembly for hanging an object on a wall, comprising:
a first anchor component including a first base having front and back sides, at least one wall penetrating retainer extending from the first base, the wall penetrating retainer having a wall penetrating extent that protrudes rearwardly of the first base and has a downwardly curved configuration;
a second anchor component including a second base having front and back sides, at least one wall penetrating retainer extending from the second base, the wall penetrating retainer of the second anchor component having a wall penetrating extent that has a curved configuration;
the second anchor component pivotably associated with the first anchor component via a hinge connection between the first base and the second base for movement of the second anchor component between an anchoring orientation and a non-anchoring orientation to enable staged installation of the anchor assembly into a wall, wherein the wall penetrating retainer of the second anchor component is positioned alongside the wall penetrating retainer of the first anchor component when the second anchor component is in the anchoring orientation, and the wall penetrating extent of the wall penetrating retainer of the second anchor component curves downwardly when the second anchor component is in the anchoring orientation.

25. The anchor assembly of claim 24 wherein:
the wall penetrating extent of the first anchor component is arcuate and a center of a radius of curvature of the wall penetrating extent of the first anchor component is located substantially at a distal side of the first base;
the wall penetrating extent of the second anchor component is arcuate and a center of a radius of curvature of the wall penetrating extent of the second anchor component is located substantially at a hinge axis of the hinge connection.

26. The anchor assembly of claim 24 wherein:
in the anchoring orientation the back side of the second base is positioned in contact with the front side of the first base and the wall penetrating extent of the second anchor component protrudes rearwardly of the first base, in the non-anchoring orientation the second anchor component is pivoted away from the first anchor component and hangs forwardly of and/or downward from the first anchor component.

27. The anchor assembly of claim 24 wherein:
the first anchor component is formed as a monolithic unit of metal plate construction, the first base formed by a first base plate, and the wall penetrating retainer of the first anchor component extends from one edge of the first base plate;
the second anchor component is formed as a monolithic unit of metal plate construction, the second base formed by a second base plate, and the wall penetrating retainer of the second anchor component extends from one edge of the second base plate.

28. The anchor assembly of claim 24 wherein the at least one wall penetrating retainer of the first anchor component comprises first and second wall penetrating retainers extending from the first base, and the at least one wall penetrating retainer of the second anchor component comprises third and fourth wall penetrating retainers extending from the second base.

29. The anchor assembly of claim 28 wherein the first and second wall penetrating retainers have respective distal tips that are laterally spaced apart by a first distance and the third and fourth wall penetrating retainers have respective distal tips that are laterally spaced apart by a second distance, the second distance is smaller than the first distance.

30. An anchor assembly for hanging an object on a wall, comprising:
  a first anchor component including a first base having front and back sides, a first wall penetrating retainer extending from the first base, the first wall penetrating retainer having a first wall penetrating extent that protrudes rearwardly of the first base and has a downwardly curved configuration;
  a second anchor component including a second base having front and back sides, a second wall penetrating retainer extending from the second base, the second wall penetrating retainer having a second wall penetrating extent that has a curved configuration;
  the second anchor component pivotably associated with the first anchor component via a hinge connection for movement between an anchoring orientation and a non-anchoring orientation to enable staged installation of the anchor assembly into a wall, wherein the second wall penetrating extent curves downwardly when the second anchor component is in the anchoring orientation;
  the first wall penetrating extent of the first anchor component is arcuate and has a first radius of curvature;
  the second wall penetrating extent of the second anchor component is arcuate and has a second radius of curvature, the second radius of curvature is different than the first radius of curvature.

31. The anchor assembly of claim 30 wherein the second radius of curvature is smaller than the first radius of curvature.

32. An anchor assembly for hanging an object on a wall, comprising:
  a first anchor component including a first base having front and back sides, at least one wall penetrating retainer extending from the first base, the wall penetrating retainer having a wall penetrating extent that protrudes rearwardly of the first base and has a curved configuration;
  a second anchor component including a second base having front and back sides, at least one wall penetrating retainer extending from the second base, the wall penetrating retainer of the second anchor component having a wall penetrating extent that has a curved configuration;
  the second anchor component pivotably associated with the first anchor component via a hinge connection between the first base and the second base for movement of the second anchor component between an anchoring orientation and a non-anchoring orientation to enable staged installation of the anchor assembly into a wall,
  wherein the first base includes first and second lateral sides, a first head portion and a first body portion, each wall penetrating retainer of the first anchor component extends from the first head portion, a lateral dimension of the first head portion running from the first lateral side to the second lateral side is larger than a lateral dimension of the first body portion running from the first lateral side to the second lateral side;
  wherein the second base includes third and fourth lateral sides, a second head portion and a second body portion, each wall penetrating retainer of the second anchor component extends from the second head portion, a lateral dimension of the second head portion running from the third lateral side to the fourth lateral side is larger than a lateral dimension of the second body portion running from the third lateral side to the fourth lateral side.

33. The anchor assembly of claim 32 wherein:
  the hinge connection is disposed on the first body portion and the second body portion.

34. An anchor assembly for hanging an object on a wall, comprising:
  a first anchor component including a first base having front and back sides, a first wall penetrating retainer extending from the first base, the first wall penetrating retainer having a first wall penetrating extent that protrudes rearwardly of the first base and has a curved configuration;
  a second anchor component including a second base having front and back sides, a second wall penetrating retainer extending from the second base, the second wall penetrating retainer having a second wall penetrating extent that;
  the second anchor component pivotably associated with the first anchor component via a hinge connection for movement between an anchoring orientation and a non-anchoring orientation to enable staged installation of the anchor assembly into a wall;
  the first base includes first and second spaced apart stabilizing legs distal from the first wall penetrating retainer of the first anchor component;
  the hinge connection is formed in part by a hinge loop located between the first and second stabilizing legs.

35. An anchor assembly for hanging an object on a wall, comprising:
  a first anchor component including a first base having front and back sides, at least one wall penetrating retainer extending from the first base, the wall penetrating retainer having a wall penetrating extent that protrudes rearwardly of the first base and has a curved configuration;
  a second anchor component including a second base having front and back sides, at least one wall penetrating retainer extending from the second base, the wall penetrating retainer of the second anchor component having a wall penetrating extent that has a curved configuration;
  the second anchor component pivotably associated with the first anchor component via a hinge connection for movement between an anchoring orientation and a non-anchoring orientation to enable staged installation of the anchor assembly into a wall;
  a hook element is located on the front side of the first base, and the second base includes an opening through which the hook element extends when the second anchor component is in the anchoring orientation, and when the second anchor component is in the non-anchoring orientation the hook element does not extend through the opening.

36. An anchor assembly for hanging an object on a wall, comprising:
  a first anchor component including a first base having front and back sides, first and second wall penetrating retainers extending from the first base, the first and second wall penetrating retainers each having a wall penetrating extent that protrudes rearwardly of the first base and has a curved configuration;

a second anchor component including a second base having front and back sides, third and fourth wall penetrating retainers extending from the second base, the third and fourth wall penetrating retainers each having a wall penetrating extent that has a curved configuration;

the second anchor component pivotably associated with the first anchor component via a hinge connection for movement between an anchoring orientation and a non-anchoring orientation to enable staged installation of the anchor assembly into a wall;

wherein the first and second wall penetrating retainers are laterally spaced apart by a first distance and the third and fourth wall penetrating retainers are laterally spaced apart by a second distance, the second distance is smaller than the first distance;

wherein the third and fourth wall penetrating retainers are positioned between the first and second wall penetrating retainers when the second anchor component is in the anchoring orientation.

37. The anchor assembly of claim 36 wherein one or more portions of the back side of the first base lie in a wall mount plane for abutting a wall surface when the anchor assembly is installed, and respective portions of the first, second, third and fourth wall penetrating retainers that lie in the wall mount plane when the second anchor component is in the anchoring orientation are positioned at substantially a same height.

* * * * *